United States Patent
Pels et al.

(10) Patent No.: US 6,887,180 B2
(45) Date of Patent: May 3, 2005

(54) POWER TRAIN WITH HYBRID POWER SOURCE

(75) Inventors: Thomas Pels, Achern (DE); Dierk Reitz, Baden-Baden (DE); Martin Dilzer, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/112,575

(22) Filed: Mar. 29, 2002

(65) Prior Publication Data

US 2002/0177504 A1 Nov. 28, 2002

(30) Foreign Application Priority Data

Mar. 30, 2001 (DE) ......................... 101 16 004

(51) Int. Cl.[7] .............................. B60K 41/02; B60K 1/02
(52) U.S. Cl. ............................................. 477/3; 477/5
(58) Field of Search .................................. 477/3, 5, 904; 180/65.2, 65.3, 65.4

(56) References Cited

U.S. PATENT DOCUMENTS

| | | |
|---|---|---|
| 4,684,007 A | 8/1987 | Maucher |
| 5,111,924 A | 5/1992 | Reik et al. |
| 5,161,660 A | 11/1992 | Huber |
| 5,169,365 A | 12/1992 | Friedmann |
| 5,337,848 A * | 8/1994 | Bader ........................... 477/5 |
| 5,713,425 A * | 2/1998 | Buschhaus et al. ........ 180/65.2 |
| 5,759,106 A | 6/1998 | Reik et al. |
| 5,895,333 A | 4/1999 | Morisawa et al. |
| 5,980,386 A | 11/1999 | Friedmann |
| 6,019,183 A * | 2/2000 | Shimasaki et al. ..... 180/65.2 X |
| 6,019,698 A | 2/2000 | Lawrie et al. |
| 6,059,059 A | 5/2000 | Schmidt-Brücken |
| 6,209,407 B1 | 4/2001 | Heinzel et al. |
| 6,291,902 B1 * | 9/2001 | Ogane et al. .................. 290/34 |
| 6,447,417 B2 * | 9/2002 | Kanehisa ........................ 475/5 |
| 6,555,927 B1 * | 4/2003 | Suzuki et al. ................. 290/34 |
| 6,591,705 B1 * | 7/2003 | Reik et al. ..................... 74/343 |
| 2003/0005076 A1 * | 1/2003 | Tamor ....................... 180/65.2 |

* cited by examiner

*Primary Examiner*—Roger Pang
(74) *Attorney, Agent, or Firm*—Darby & Darby

(57) ABSTRACT

The power train of a motor vehicle employs a hybrid drive including a combustion engine and an electrical machine. The transmission of the power train is shiftable into different gears in dependency upon the operating conditions of the vehicle. Such conditions include a traction condition when the vehicle is propelled by the engine and/or by the electrical machine, a coasting condition when the vehicle is being decelerated with attendant conversion of kinetic energy into electrical and/or rotational energy and storage of converted energy, a cold starting condition when the cold engine is started by the electrical machine, and a warm starting condition when the hot engine is started by the electrical machine and/or by at least one flywheel.

23 Claims, 9 Drawing Sheets

POWER TRAIN WITH HYBRID POWER SOURCE

CROSS-REFERENCE TO RELATED CASES

This application claims the priority of the commonly owned copending German patent application Serial No. 101 16 004.6 filed Mar. 30, 2001. The disclosure of the just mentioned German application, as well as that of each US and foreign patent and patent application identified in the specification of the present application, is incorporated herein by reference.

BACKGROUND OF THE INVENTION

The present invention relates to power trains, i.e., to power producing and power transmitting components of motor vehicles. More particularly, our invention relates to improvements in so-called hybrid drives which, in addition to at least one internal combustion (i.e., fuel consuming) engine, employ at least one electrical machine which is connectable with and disconnectable from the engine and can act as a generator as well as a motor, and at least one transmission or gearbox which is interposed between the engine and/or the electrical machine on the one hand, and at least one driven part (such as a differential or one or more wheels) on the other hand and can be shifted into any one of several gears in dependency upon the condition of the vehicle and/or its power train.

A characteristic of a hybrid drive is that the wheels of the motor vehicle embodying such drive can receive motion from the engine and/or from the electrical machine. Furthermore, specially designed versions of hybrid drives and of the motor vehicles embodying hybrid drives can be operated in such a way that, when the operator of the vehicle applies the brakes, kinetic energy is transmitted to the electrical machine for conversion into electrical energy which is stored in one or more batteries and/or other suitable storage facilities (e.g., one or more cells or others).

Hybrid drives of the above outlined character can compete with standard power trains only if their efficiency is very high and if they can operate satisfactorily with energy-saving engines, such as diesel engines and especially those with direct fuel injection.

OBJECTS OF THE INVENTION

An object of the present invention is to provide a power train which employs a hybrid drive and the efficiency of which is superior to that of presently known power trains of such character.

Another object of the invention is to provide a power train which employs a hybrid drive and which, during deceleration of the motor vehicle, can utilize the kinetic energy more satisfactorily than power trains utilizing presently known hybrid drives.

A further object of the invention is to provide a hybrid drive which is highly efficient during certain stages of operation of the motor vehicle with the engine as well as or during certain stages of operation with the electrical machine.

An additional object of the invention is to provide a novel and improved method of operating a motor vehicle having a power train which embodies the above outlined hybrid drive.

Still another object of the instant invention is to provide a novel and improved method of saving fuel in power trains of motor vehicles which employ hybrid drives.

A further object of the present invention is to provide a motor vehicle which embodies a power train employing a novel and improved hybrid drive.

Another object of the invention is to provide a novel and improved combination of a fuel combusting engine, an electrical machine, a transmission and one or more clutches for use in the power train of a motor vehicle.

SUMMARY OF THE INVENTION

One feature of the present invention resides in the provision of a power train for moving a motor vehicle during different stages of operation of the vehicle. The power train comprises at least one internal combustion engine (e.g., a diesel engine with fuel injection), at least one electrical machine which is connectable with the engine and is arranged to function as a motor or as a generator, and at least one transmission which is interposed between the engine and at least one (driven) wheel of the motor vehicle and is shiftable into a plurality of gears (such as reverse and five forward gears, reverse and six forward gears, or reverse and an infinite number of forward gears) in dependency upon the operating conditions of the vehicle. Such conditions can include:

(a) a traction condition which involves propulsion of the vehicle by the engine and/or by the electrical machine;

(b) a coasting condition involving a deceleration of the vehicle with resultant conversion of kinetic energy (which develops as a result of deceleration of the vehicle) into electrical and/or rotational energy and at least short-lasting storage of converted energy in at least one storage facility (e.g., in one or more storage batteries);

(c) cold starting condition which involves starting of the still cold or already cold engine by the electrical machine; and (d) a warm starting condition involving a starting of the still hot engine by the electrical machine and/or by a rotary mass.

Thus, the aforedescribed power train and its hybrid drive can effect a conversion of kinetic energy (which develops during deceeration of the motor vehicle) not only into electrical energy but can store (depending upon the operating condition of the vehicle) the kinetic energy in the form of electrical and/or mechanical energy, such as rotational energy. The operating condition can involve deceleration from any one of several speeds, and such deceleration can be interrupted prior to stoppage of the motor vehicle or can lead to a full stoppage of the vehicle. The intensity of desired deceleration is also a factor which is or which can be taken into consideration.

A conversion of kinetic energy (such conversion is often referred to as recuperation) can involve conversion into electrical energy, into mechanical energy or into electrical and mechanical energies, depending upon the conditions (such as coasting conditions). For example, the rotatory mass (such as at least one flywheel) can take up some mechanical energy and stores such mechanical energy in the form of rotational energy. On the other hand, the electrical machine (or at least one of several electrical machines) can convert the remaining mechanical energy (or some of the remaining mechanical energy) into electrical energy which is stored in a suitable storage facility (e.g., in a high-capacity battery, a high-capacity accumulator and/or one or more different storage facilities). It will be appreciated that a conversion of mechanical energy into electrical energy and the storage of the thus obtained electrical energy involve the utilization of suitable power electronics. Such electronics are familiar to those skilled in the art to which the present invention pertains.

The electrical machine and the rotary mass which is required for mechanical recuperation are designed in dependency upon the maximum energy which is to be recovered. For example, the electrical machine and/or the rotary mass to be utilized in a compact motor vehicle can be designed for energy recuperation in the range of between about 3 and 25 kilowatts, preferably between about 5 and 15 kilowatts.

By providing the motor vehicle with suitable means for maintaining a certain minimal distance between successive vehicles, and by properly educating the operators of motor vehicles regarding safe driving, recuperation of vehicles can be readily resorted to as an alternative to conventional service brakes of motor vehicles. However, it is normally or often of advantage to equip the motor vehicle with the improved power plant as well as with a brake system which can be utilized in emergency situations as well as when the operator desires to slow down or arrest the vehicle for other reasons.

It can be of advantage to control and regulate the deceleration of the motor vehicle by recuperation and, if necessary, by resorting to a conventional brake arrangement with a common control unit which, in addition to the just enumerated functions, can also perform other functions involving the control and regulation of the vehicle such as, for example, engine regulating undertakings. Furthermore, and if the motor vehicle is equipped with an anti-lock brake system, the control unit can be utilized to control the anti-lock brake system in synchronism with regulation of the decelerating undertakings of the recuperating means (such as the electrical machine) and/or the mechanical recuperating means (such as the rotary mass).

In accordance with a feature of the invention, a mechanical energy storing system of the improved power train can constitute a flywheel which can be coupled for rotation with and uncoupled from an output element (such as a crankshaft) of the combustion engine as well as with a rotary input shaft of the transmission. For example, the power train can employ two clutches which can be actuated to disconnect the flywheel from the rotary output element of the engine and from the input shaft of the transmission to serve as an energy utilizing clutch or inertia flywheel clutch. This renders it possible to ensure, for example, that in response to engagement of at least one of the clutches, the recuperation takes place toward the input shaft of the transmission. At such time, the inertia flywheel clutch can be disengaged from the crankshaft (output element) of the combustion engine to ensure that, during slowing down of the vehicle, the flywheel is accelerated without drag losses of the engine. The inertia flywheel clutch is thereupon engaged to connect the thus accelerated flywheel with the crankshaft in order to start the engine; at such time, the inertia flywheel clutch is disengaged from the input shaft of the transmission.

It can be of particular advantage if the flywheel is the rotor of the electrical machine; the characteristics of such flywheel are preferably selected in such a way that the flywheel constitutes a mechanical energy storing means and is attuned to the recuperable kinetic energy. This renders it possible to dispense with a separate flywheel and, when the electrical machine is idle (i.e., when it is disconnected from the electrical energy storing means or current consuming means), to carry out a purely mechanical recuperating operation. Electrical recuperation can take place if the electrical machine is connected with a source of electrical energy; under such circumstances, the electrical energy storing means is charged and/or the current consuming device(s) (such as one or more devices pertaining to safety and/or comfort of the occupant(s) of the motor vehicle) is or are in use.

It is also possible to properly relate the moment of inertia of the rotor (flywheel) of the electrical machine to the mechanical recuperation in such a way that a discrete rotary mass (flywheel) can be coupled with the rotor of the electrical machine by resorting, for example, to a friction clutch, to another clutch (such as a dog clutch), to one or more freewheels and/or to combinations of two or more such coupling means. The discrete rotary mass can be uncoupled from the rotor of the electrical machine to optimize the electrical recuperation by reducing the moment of inertia as a result of such uncoupling. It is to be noted here that, in this context, electrical recuperation (when the circuit of the electrical machine is completed) invariably entails a mechanical recuperation with unavoidable acceleration of the rotor due to the rather substantial mass of the latter.

In order to enhance the efficiency of the hybrid drive, it is of advantage if, during deceleration of the motor vehicle, the transmission of the power train is shifted from a lower gear into a higher gear (as seen in a direction from the driven wheel(s) of the motor vehicle). In other words, when the vehicle undergoes a deceleration, the transmission is shifted into a gear such that the RPM at the mechanical and/or electrical recuperating arrangement is set to ensure a maximum energy output. This can mean that, if electrical recuperation is desired, the transmission ratio is selected to provide for the rotor an RPM which matches or at least closely approximates the RPM at optimum efficiency and/or at maximum output (performance) of the electrical machine.

Alternatively, in the event of a purely mechanical recuperation, the ratio (gear) of the transmission is set to ensure the selection of maximum rotational speed for the flywheel. For example, if the transmission is shiftable into a limited number of gears (e.g., a reverse gear and five or six forward gears), the ratio can be that which is established by a particular gear of the transmission, i.e., a certain gear on the input shaft mates with a certain gear on the output shaft of the transmission. If the transmission is a continuously variable transmission (CVT) or a so-called geared-neutral transmission, each of which is shiftable into a practically infinite number of different gears, the selected gear is preferably the overdrive.

It will be appreciated that the selection of a particular gear of the transmission depends upon the desired nature and/or extent of deceleration of the motor vehicle and/or upon the desired comfort to the occupant(s) of the vehicle. In accordance with a presently preferred embodiment, the transmission is progressively shifted into a higher gear in response to deceleration of the motor vehicle and causes the power train to carry out a mechanical recuperation, i.e., the electrical machine remains idle so that the kinetic energy which develops during such stage or condition of operation of the motor vehicle is converted into rotational energy. When the shifting of the transmission into a higher gear reaches the highest gear, i.e., when the freewheel (e.g., the rotor of the electrical machine) is rotated at a maximum speed, the electrical machine is turned on so that a mechanical recuperation then takes place simultaneously with electrical recuperation. Mechanical recuperation can take place during a relatively short interval of deceleration of the motor vehicle, e.g., from 50 to 40 kilometers per hour; this is advantageous (in comparison with electrical recuperation) as far as the recuperation of energy is concerned because the efficiency of conversion from mechanical into rotational energy is higher than of the conversion from mechanical to electrical energy.

In accordance with a further presently preferred embodiment of our invention, and while the motor vehicle undergoes a desired deceleration, kinetic energy is transformed into mechanical energy until a shifting of the transmission into a higher gear (as considered in a direction from the at least one driven wheel of the motor vehicle) reaches an upper (maximum) value. From there on, the remaining kinetic energy is converted into electrical energy. Once the motor vehicle has come to a halt, it is of advantage to convert at least a portion of rotational energy which remains stored in the flywheel also into electrical energy. In accordance with a particularly advantageous embodiment of this invention, rotational energy is converted into electrical energy to such an extent that a certain remnant of kinetic energy remains unconverted and its amount is selected in such a way that it is sufficient to restart the engine (which was turned off during deceleration of the motor vehicle).

As already mentioned hereinbefore, the nature of recuperation can be selected in dependency upon the extent of deceleration of the motor vehicle. The controlling factor is or can be the absolute deceleration or a gradient which is derived therefrom. A shifting or switching point or range or threshold value, constituting or determining a transition from mechanical to electrical recuperation, can be fixed or it can be altered dynamically depending upon operational parameters. For example, if the decelerations or deceleration gradients are relatively small and the operator of the motor vehicle fails to carry out a step or operation indicating that a more pronounced deceleration is desired, the recoverable kinetic energy is converted into rotational energy and, once the shifting or switching point (threshold value) is reached (i.e., in the event of a greater deceleration), or if the operator undertakes the step or steps indicating a desire for further deceleration, the kinetic energy is converted into electrical energy.

If a shifting or switching point can be fixed because the threshold value is fixed, it can be between 0.5 m/s$^2$ and 3 m/s$^2$, preferably between 1 m/s$^2$ and 2 m/s$^2$. It is particularly advantageous if the threshold value is adjustable by the operator of the motor vehicle in dependency upon the desired deceleration. When such desired deceleration is reached, the operator generates an unequivocal and measurable signal which is transmitted to the control unit to indicate the intensity and/or duration of the desired deceleration. For example, the exact nature of the deceleration can be indicated in a manner known from the art of actuating a brake pedal. The signal can be generated by a sensor which is associated with the brake pedal and is responsive to the pressure being applied thereto by the operator of the motor vehicle. Alternatively, the operator can actuate a hydraulic system analogous to or constituting the system which is actuated to apply the vehicle brakes. Certain other signal generating systems can be utilized with equal or similar advantage.

If the recuperating system is designed to complete the recuperation of mechanical energy into electrical and/or rotational energy prior to a desired maximum deceleration of the motor vehicle, the latter is provided with a standard brake system and/or with an additional brake system which is actuated by the operator when the deceleration involving a recuperation of mechanical energy is completed.

An additional desirable undertaking for shifting from a purely mechanical recuperation to a recuperation with wired-up electrical machine can be carried out in such a way that the switching or shifting point is selected adaptively by at least one variable operational parameter. For example, the shifting point can be selected by the operator and by her or his mode of operation of the motor vehicle with resort to fuzzy logic or to a calculation by neural logic. By way of example, when the motor vehicle is caused to proceed at a rather pronounced speed with several abrupt brakings, one can immediately start with electrical recuperation. On the other hand, if the motor vehicle is driven at a more balanced speed (e.g., if the vehicle can be said to be cruising), it is often preferred to resort to mechanical recuperation. Such calculation of the shifting point can also involve an appropriate selection of the gear ratio of the transmission. For example, when the motor vehicle is driven at a rather high speed with correspondingly sudden or abrupt braking maneuvers, it is more convenient to resort to a low gear, i.e., to a low transmission ratio with correspondingly larger moments of deceleration and recuperation. On the other hand, when the deceleration is gradual or predominantly gradual, one can cause the transmission to select an ideal RPM for the electrical machine and to carry out an electrical recuperation.

A further novel proposal to enhance the overall efficiency of a hybrid drive involves an automated regulation of the transmission so that the combustion engine operates in the range of minimal fuel consumption and, if the operator demands that the output of the power train be increased, for example, while the vehicle is to overtake one or mote vehicles in front of it, this can be carried out by utilizing the electrical machine as a means for assisting the combustion engine. This can be accomplished in a highly efficient and hence satisfactory manner if the outputs of the engine (within the range of its minimal fuel consumption) and the electrical machine are combined and the thus obtained combined output of the power train is made available to the operator in a reproducible manner within a range which is determinable by the operator. Of course, and in order to ensure a desired reproducibility of the overall output, it is or it might become necessary to depart from an operation of the engine with minimal fuel consumption when at least one parameter which influences the output of the electrical machine could reduce the combined output of the engine and the electrical machine. For example, such influences can include (a) RPM-dependent and/or temperature-dependent parameters or factors which exert an undesirable influence upon the characteristic curve of the output of the electrical machine, (b) the condition of the energy source for the electrical machine (such as the condition or extent of charging and/or aging of the battery of the motor vehicle), and (c) the temperature of output electronics which regulate the electrical machine or control the supplying of current thereto. A departure from minimal consumption is then effected in such a way that, in the event of adverse influencing of the output of the electrical machine, one departs from minimal consumption to the same extent to which the aforementioned at least one parameter reduces the output of the electrical machine.

Still another novel contribution to greater effectiveness of a hybrid drive includes the provision of an electrical machine which is selectively connectable with the input shaft of the transmission or with the output shaft of the transmission, i.e., with the shaft which is in torque transmitting engagement with the at least one driven wheel of the motor vehicle (e.g., with two driven wheels by way of a differential). In this manner, the electrical machine can be operatively connected with that shaft which offers the optimal RPM range as concerns the RPM-dependent maximal output. For example, to this end one can assemble a power train wherein the electrical machine is provided in an automated power shift transmission with a starter clutch which switchably connects the input shaft of the transmission with the crankshaft (output element) of the engine as well as with a load transmitting clutch (such as a friction clutch) which engageably and disengageably connects the electrical machine with the output shaft of the transmission. The connection between the electrical machine and the output shaft of the transmission can be interrupted by a dog clutch. When the dog clutch is engaged and the power shift clutch is disengaged, the electrical machine is connected with the output shaft of the transmission; on the other hand, the electrical machine is connected with the input shaft of the transmission when the dog clutch is disengaged but the starter clutch and the power shift clutch are engaged. It is also of advantage if, in such power trains, the electrical machine synchronizes the RPM of the input shaft of the transmission with the RPM of the output shaft of the transmission when the transmission is shifted into at least one of its gears.

Still further, one can employ for example a friction clutch to connect the electrical machine with the crankshaft of the combustion engine. This ensures that, during a recuperation, the combustion engine can be separated from the electrical machine and, when the friction clutch is engaged, the electrical machine can start the combustion engine from a standstill (i.e., from a state of idleness).

For reasons of saving energy, it can be of advantage (i.e., desirable) to maintain the combustion engine in a state of idleness (i.e., to arrest the engine) when the motor vehicle is not in motion and to start the engine before the vehicle is set in motion. In order to contribute to the comfort of the occupant(s) of the vehicle, as well as for safety reasons, it can be of particular advantage that the operator start the engine relatively early when the need for setting the vehicle in motion arises. In contrast to prior proposals, it is now proposed (if the operator was pressing the brake pedal while the vehicle was not in motion) to start the engine immediately upon release of the brake pedal rather than only at the time of actuation of the gas pedal. This ensures that, within this critical time range, such mode of operation can contribute significantly to immediate availability of torque being supplied by the combustion engine.

In accordance with still another embodiment of the invention, the kinetic energy which develops during deceleration of the motor vehicle in the course of recuperation is directed into an air conditioning system, for example, into a compressor which is preferably designed in such a way that it can be used as a cooler or as a heater. A suitable compressor can operate with carbon dioxide and can be operatively connected directly to the transmission. The latter further encompasses the electrical machine which is connectable with the input or output shaft or with a countershaft. It is of particular advantage to mount the compressor of the air conditioning unit on one of the input shafts of a twin clutch transmission; the electrical machine can be mounted on that input shaft which carries the air conditioning unit or on the other input shaft. By mounting the compressor of the air conditioning system in the region of the transmission, it is now possible to ensure that, when the combustion engine is turned off and the vehicle is coasting, the compressor of the air conditioning system can be operated, e.g., by the electrical machine and/or by kinetic energy which becomes available in the course of the coasting operation so that the motor vehicle can be heated and/or cooled. This can be of particular advantage in connection with combustion engines, e.g., diesel engines with direct fuel injection, because heat losses attributable to heating are low. It will be appreciated that the compressor of the air conditioning system can be drivingly coupled in the transmission directly with the electrical machine.

It is further within the purview of the instant invention to provide the power train with a friction clutch which, by way of example, can separably connect the transmission to the combustion engine. Such connection takes place during starting and, at that time, the friction clutch is engaged only to the extent which is necessary to transmit starting torque from the electrical machine to the combustion engine. This ensures that the clutch can be more rapidly disengaged upon starting of the engine and the transmission can be more rapidly shifted into a starting gear; all in all, the motor vehicle can be set in motion more rapidly than if the clutch were fully engaged in the course of the starting operation.

Alternatively, or in parallel with the just described mode of operation, the friction clutch can effect an axial clamping of the clutch disc or clutch plate which carries friction linings and is disposed between two coaxial pressure plates one of which is fixed and the other of which is movable toward and away from and cannot rotate relative to the fixed pressure plate and is biased toward the fixed pressure plate by resilient means. The resilient means has a linear distance-to-force ratio. Such arrangement can ensure the generation of a linearly increasing torque during engagement and a linearly decreasing torque during disengagement of the friction clutch; this, in turn, can entail a shortening of intervals which are required for engagement and disengagement of the clutch.

Additional shortening of the interval which is required to set the motor vehicle in motion upon starting of the combustion engine can be achieved in that the friction clutch, which has been disengaged preparatory to shifting of the transmission into a different gear, is immediately moved to a sensing point and the vehicle is set in motion immediately upon completion of synchronization of the selected transmission gear. The sensing point is that point of the axial path of the means for disengaging the energy storing device of the clutch which acts upon the axially movable pressure plate of the friction clutch, at which point the clutch disc is still out of frictional engagement with the pressure plates, i.e., when the combustion engine is still out of torque transmitting engagement with the transmission. Such movement toward the sensing point ensures that one can save the time which, at the instant of synchronization, were necessary to reach the sensing point subsequent to the carrying out of the synchronizing operation.

Friction clutches with pressure plates, clutch discs bearing friction linings and resilient means for biasing one of the pressure plates are disclosed in numerous US patents which are owned by the assignee of the present application, e.g., in U.S. Pat. No. 5,111,924 granted May 12, 1992 to Reik et al. for "TORQUE TRANSMITTING AND TORSION DAMPING APPARATUS FOR USE IN MOTOR VEHICLES".

In accordance with a further feature of the present invention, one can improve the efficiency of a power train wherein the combustion engine is directly connected with the electrical machine. Such hybrid drives, which are equipped with a so-called crankshaft starter generator, are desirable because they can be produced at a relatively low cost since one can dispense with a clutch which is normally provided between the electrical machine and the combustion engine, and normally disconnects the combustion engine in the course of the recuperating operation. However, this economical advantage of conventional hybrid drives also entails certain drawbacks, e.g., that—during recuperation—the combustion engine and its drag torque must be towed along and, therefore, the kinetic energy which is recoverable during the deceleration stage of a compact motor vehicle is reduced by between about 10 and 15 kilowatts at 3000 RPM. Experiments indicate (that, in such power trains, a shifting into a higher gear in the aforedescribed conventional manner entails an unnecessary increase of drag torque because the drag torque of the engine normally increases with the increasing RPM.

In contrast to such conventional undertakings, the improved power train exhibits the important advantage that, during coasting, the transmission can be shifted into a gear which allows for coasting at a low RPM. This renders it possible to operate the electrical machine, too, at a lower RPM and the overall outcome with resort to such mode of operation is more satisfactory because the recuperation stage entails greater savings in energy than if the transmission were shifted into a lower gear. It is advisable to shift the transmission into a gear (or to select for a CVT transmission a gear) with a ratio of less than about 1500 RPM, preferably less than about 1000 RPM.

A further important novel contribution to an increase of efficiency of a power train with a crankshaft starter generator involves the utilization of an arrangement wherein, during coasting, the electrical machine is operated as a generator (to reduce the kinetic energy) until deactivation of a coasting circuit which is provided in the motor vehicle between the combustion engine and the transmission and stops the combustion engine. This renders it possible to recuperate without consumption of fuel up to the time of turning off the coasting circuit for the sake of greater comfort to the occupant(s) of the motor vehicle. The engine is turned off during idling to avoid unnecessary consumption of fuel. In this manner, the vehicle can be set in motion immediately without renewed starting of the combustion engine with the combustion engine still running until the coasting circuit is deactivated.

A further embodiment of the improved power train, which can be put to use with all hybrid drives, involves a lowering of the compression ratio of the combustion engine during starting. For example, a lowering of the compression ratio during starting can take place by changing the displacement by axial shifting of the crankshaft and/or the cylinder head and/or by varying the control times. For example, and in order to still carry out the starting operation in a reliable manner, the compression ratio can be reduced from 14 to 8 to thus effect a pronounced reduction of starting output. Since the output which is required to start a combustion engine depends upon its compression ratio, one can save energy by reducing the compression ratio and the electrical machine can be dimensioned for smaller output which is sufficient to start the engine, especially if the electrical machine were to be dimensioned for greater strength only on the ground of being capable of furnishing the required starting torque (e.g., for a combustion engine with a high compression ratio and/or with a greater number of cylinders) rather than for generatoror recuperation purposes. It is to be noted here that the electrical machine can be temporarily stressed above the nominal output, e.g., for certain uses as a generator, a recuperator and/or booster. Consequently, one can employ with advantage electrical machines with a smaller output if the required starting torque can be selected to be smaller.

It is also advisable to apply torque to the output element of the combustion engine shortly or immediately upon completion of a recuperating operation; this is made possible if the combustion engine is not fully disengaged from the input shaft of the transmission (by disengaging a clutch or the like). Instead, the combustion engine can be pulled along (preferably at an RPM of less than 1000, especially at the idling RPM); this can be achieved by operating the clutch with slip (i.e., in the partly engaged condition of the clutch). The thus increased energy consumption is within an acceptable range. During starting, or during renewed acceleration following a recuperating operation, the clutch can transmit torque more rapidly to thus contribute to a more reliable, more comfortable and faster acceleration following a recuperation because it is not necessary to restart the engine. Alternatively or in addition to such undertaking, the compression or compression ratio can be lowered, the combustion chamber valves can be opened in part and/or one or more cylinders can be turned off.

In accordance with a further embodiment of the novel power train with hybrid drive, such power train can employ an electrical machine which is installed close to a starter clutch. It is of advantage to control the starter clutch (as concerns its heat generating slip) and the electrical machine (as concerns its heat generation in actual use, especially within the range of its maximum output or even beyond such maximum output for limited periods of time) in dependency upon the heat output or yield of at least one of the starter clutch and the electrical machine. Thus, each of these aggregates is operated in such a way that they cannot undergo damage in response to overheating of at least one thereof. This can mean that, when the clutch operates with slip, the output of the electrical machine is reduced; in fact, under certain extreme circumstances the electrical machine is brought to a halt to thus minimize the exchange of heat with the surrounding atmosphere or to maintain such exchange of heat within a range which cannot entail permanent damage to materials which are adjacent the clutch and/or the electrical machine.

Still further, and if the electrical machine operates with a substantial heat output, one simply avoids an operation of the clutch with slip or the operations of the clutch and the electrical machine are staggered, i.e., the shifting operation is postponed. It is also possible to ensure that, in the event of elevated temperatures in the region of the two aggregates (electrical machine and the starter clutch), both aggregates are operated (at least at certain timely spaced intervals) in such a way that the generation of heat energy is minimized even if the generation of heat is attributable only to one of these aggregates. The inventive concept can also be resorted to in a precautionary manner, i.e., if an overheating of the area being occupied by the two aggregates is anticipated (namely if there is a reason for such anticipation), e.g., due to the elevated temperature of such area when the power train is idle, due to pronounced slope of the road on which the motor vehicle is driven, and/or due to the pronounced weight of the load which is pulled and/or carried by the motor vehicle, the electrical machine and/or the starter clutch is operated with a reduced heat output. It is to be understood that the just discussed undertakings are or can be regulated by a central control unit which is designed to carry out the required priorizations of various steps or operations in an optimum sequence while the motor vehicle is in use. Such control unit can contribute to safety of operation of the power train and of the entire motor vehicle as well as to the comfort of the occupant(s) of the vehicle.

If the transmission of the improved power train is a CVT transmission, it is advisable to select the ratio of the transmission (during recuperation) in such a way that the electrical machine is operated with maximum efficiency and/or with maximum output. Under such circumstances, it can be of particular advantage to operate the rotor while the electrical machine is disconnected from the source of electrical energy and to carry out a mechanical recuperation; the circuit of the electrical machine is completed only when the RPM of the rotor is within the range of maximum efficiency, e.g., close to the nominal value or when the RPM of the rotor reaches the RPM of maximum output. The setting of ratio of the CVT transmission in response to adjustment of its pulleys can preferably take place with a delay which is selected by the operator of the motor vehicle and is carried out in order to select the RPM of the electrical machine in the course of a recuperating operation. To this end, the control circuit evaluates a signal which is generated by the operator and is indicative of the desired delay for adjustment of the pulleys, and the control circuit converts the signal into an actuating variable which is suitable for appropriate adjustment of the pulleys.

For example, the signal which is generated by the operator of the motor vehicle can involve a depression of the brake pedal up to a certain position, the application of a certain force (pressure) to the brake pedal and/or the application of certain pressure to a hydraulic braking system. This pressure is or can be selected in such a way that it is effective only before it reaches a certain value, e.g., a value which is necessary to carry out an emergency braking operation by way of the vehicle brake. The deceleration which is effected by the operator in the course of signal generation for the control circuit involves a recuperation of kinetic energy.

A presently preferred embodiment is constructed and operates in such a way that the operator of the motor vehicle furnishes a desired value to control a master brake management which regulates the individual deceleration undertakings, for example, also emergency braking, braking with activation of an anti-lock brake system and/or others. Actual deceleration can be ascertained by wheel RPM sensors, for example, by RPM sensors which are available in a motor vehicle and form part of an anti-lock brake system and/or an antislip regulation, system, and signals denoting such actual deceleration can be considered and/or processed by the brake management. If an acceleration takes place pursuant to a recuperation operation, the position of for example the throttle valve or for example the timely derivation of adjustment can serve as a signal by the operator for the extent of desired acceleration to effect appropriate adjustments of the pulleys in the CVT transmission to thus select the appropriate transmission ratio. The departure from the desired or actual transmission ratio can be converted into a loop which selects the change of the transmission ratio of the CVT transmission. This renders it possible to achieve a constant deceleration pattern, for example, during downhill travel of the motor vehicle.

It is, further possible to influence the brake management in a number of additional ways, e.g., in the form of pilot values, such as fixed parameters, for example, in order to avoid overloading of the computing performance of the management system. For example, fixed parameters can constitute the maximum torque which can be transmitted by a clutch between the combustion engine and the transmission, the maximum torque or the characteristic curve of the electrical machine, the maximum braking torque and possibly the characteristic effectiveness and response curve and/or the like.

In accordance with still another feature of our invention, a recuperation can be followed by a regulation of RPM of the electrical machine in dependency upon that moment of acceleration which is desired by the operator of the motor vehicle. This pertains to a recuperation which necessitates a disengagement of the starter clutch between the combustion engine and the CVT transmission in the course of recuperation, a stoppage of the combustion engine, disconnection of the electrical machine from the output shaft of the transmission by a further clutch, and starting of the combustion engine by the electrical machine upon disconnection of the latter from the output shaft and renewed engagement of the starter clutch by an impulse starter. The operator can generate a control signal which is dependent, for example, upon the position of the throttle valve and is indicative of the extent of desired acceleration and the corresponding torque of the combustion engine. The desired acceleration can be ascertained by relating the torque to the RPM of the combustion engine. In accordance with a feature of the invention, such RPM is selected for the electrical machine already prior to engagement of the starter clutch so that, when the starter clutch is engaged, the combustion engine is accelerated to the RPM at which it transmits the torque that is required by the operator. At the same time, the CVT transmission can be set to the optimal transmission ratio for the selected RPM and the separating clutch is engaged with a corresponding (minimal) slip.

Still another feature of our invention resides in the provision of a method of operating a power train during different stages of operation of a motor vehicle which embodies the power train. The power train comprises at least one combustion engine, at least one electrical machine which is connectable with the engine and is arranged to function as a motor and as a generator, and at least one transmission which is interposed between the engine and at least one wheel of the vehicle and is shiftable into a plurality of gears in depedency upon the operating conditions of the vehicle. The improved method comprises the steps of:

propelling the vehicle by at least one of the engine and the electrical machine during traction operation of the vehicle;

decelerating the vehicle during coasting of the vehicle with attendant conversion of kinetic energy (which develops as a result of deceleration of the vehicle) into at least one of electrical and rotational energies and effecting an at least short-lasting storage of converted energy in at least one storage facility;

cold starting the vehicle including starting the engine by the electrical machine while the engine is cold; and starting the engine, while it is still hot due to a previous operation, by at least one of the electrical machine and a rotatory mass.

The rotatory mass is or can be rotated by the electrical machine; such mass can include or constitute the rotor of the electrical machine.

The deceleration entails mechanical and/or electrical recuperation in dependency upon the initial speed of the vehicle, the deceleration gradient, the load which is borne and/or pulled by the vehicle and/or the extent to which a storage facility for electrical energy is charged.

A further feature of the present invention resides in the provision of a motor vehicle which comprises a plurality of ground-contacting wheels and a hybrid power train for at least one such wheel. The power train comprises an internal combustion engine, an electrical machine having a rotor connectable with the engine and being arranged to operate as a motor or as a generator, and a transmission which is interposed between the engine and the at least one wheel of the motor vehicle and is shiftable into a plurality of gears in dependency upon operating conditions of the vehicle. Such conditions include:

a traction condition involving a deceleration of the motor vehicle which entails a conversion of kinetic energy—developing as a result of deceleration of the vehicle—into electrical and/or rotational energy and at least short-lasting storage of converted energy in at least one storage facility;

a cold starting condition involving a starting of cold engine by the electrical machine; and a warm starting condition involving a starting of the engine, while the engine is still hot as a result of previous use, by the machine and/or by a rotary mass.

The novel features which are considered as characteristic of the invention are set forth in particular in the appended claims. The improved power train itself, however, both as to its construction and the modes of assembling, installing and utilizing the same, together with numerous additional important and advantageous features and attributes thereof, will be best understood upon perusal of the following detailed description of certain presently preferred specific embodiments with reference to the accompanying drawing.

DESCRIPTION OF PREFERRED EMBODIMENTS

Figure 1:
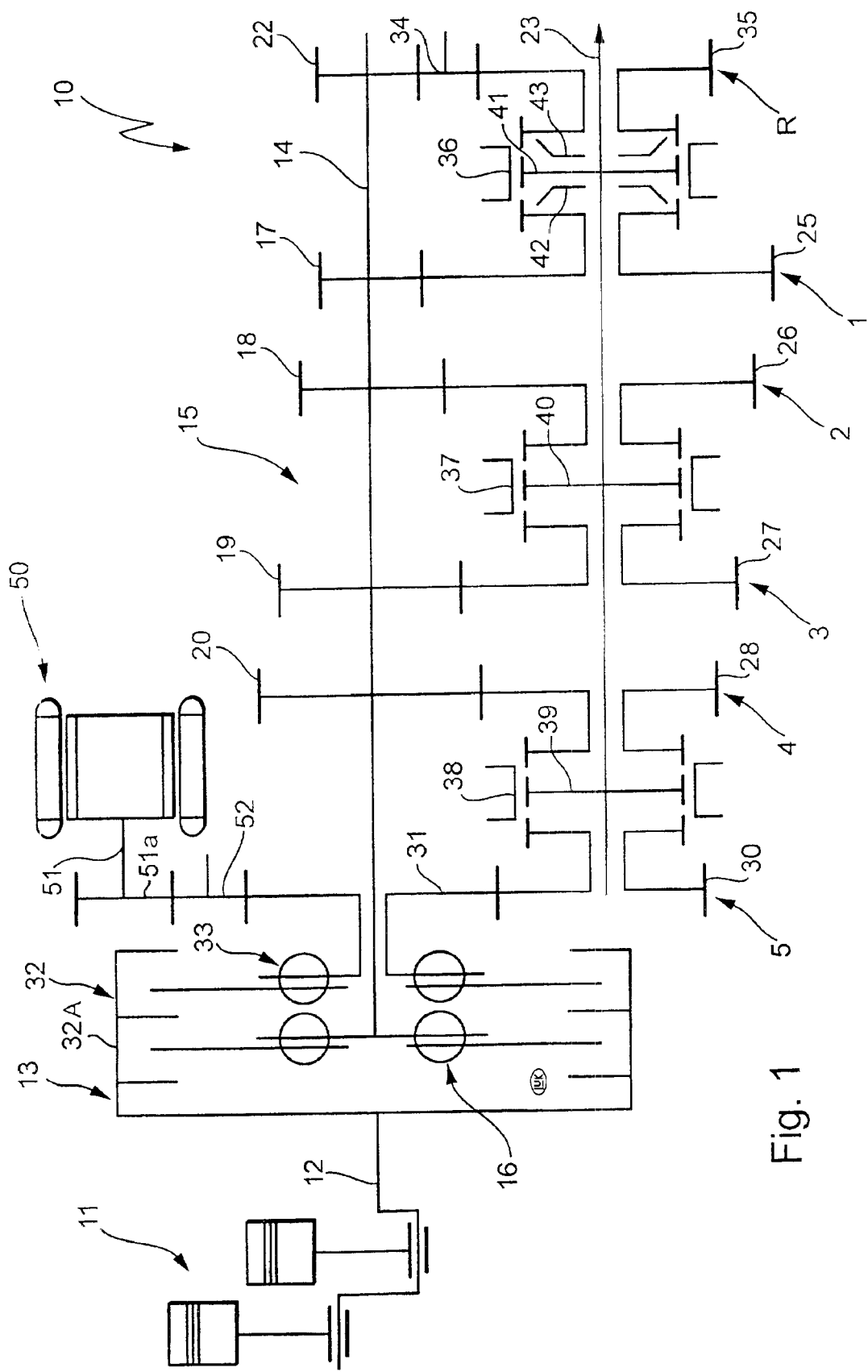
FIG. 1 is a schematic representation of a power train with a hybrid drive which embodies one form of the present invention.

FIG. 1 is a schematic elevational view of a portion of a power train 10 which can be utilized in a motor vehicle and embodies a hybrid drive constructed and assembled in accordance with one embodiment of the present invention. The power train comprises an internal combustion engine 11 having a rotary output element 12 which is a crankshaft and can transmit torque to the input shaft 14 of a manually shiftable change-speed transmission or gearbox 15 by way of a starter clutch 13. A torsional vibration damper 16 is interposed between the crankshaft 12 and the input shaft 14; this damper can form part of a composite flywheel or part of a clutch disc or clutch plate. The composite flywheel can constitute a counterpressure plate of the clutch 13 (see, for example, commonly owned U.S. Pat. No. 5,980,386 granted Nov. 9, 1999 to Friedmann et al. for "APPARATUS FOR DAMPING VIBRATIONS" or commonly owned U.S. Pat. No. 5,759,106 granted Jun. 2, 1998 to Reik et al. for "ASSEMBLY FOR COMPENSATION OF FLUCTUATIONS OF TORQUE"), or such flywheel can constitute one of several dampers or the single damper in the clutch plate of the clutch (see, for example, commonly owned U.S. Pat. No. 5,161,660 granted Nov. 10, 1992 to Huber for "CLUTCH PLATE WITH PLURAL DAMPERS" or commonly owned U.S. Pat. No. 4,684,007 granted Aug. 4, 1987 to Maucher for "CLUTCH PLATE"). It is clear that the hybrid drive of the power train 10 can employ a composite torsional vibration damper including a first damper between the crankshaft 12 and the clutch 13 as well as a second damper between the clutch 13 and the input shaft 14 of the transmission 15.

The input shaft 14 of the transmission or gearbox 15 is rigidly connected with first or fixed gears 17, 18, 19, 20 which respectively mate with loose gears 25, 26, 27, 28 rotatably mounted on the output shaft 23 of the transmission. A further gear 22 which is affixed to the input shaft 14 can transmit torque, by way of an intermediate or reversing gear 34, to a gear 35 which is rotatably mounted on the output shaft 23. The shaft 23 further loosely mounts a gear 30 which is rotatably carried by it and mates with a loose gear 31 rotatably mounted on the input shaft 14 and further meshing with an intermediate gear 52 which is in mesh with a gear 51a on the rotor 51 of an electrical machine 50.

When the gear 35 is coupled to the output shaft 23 by way of reversing gear 34, the transmission 15 is set to operate in reverse gear (R). The shaft 14 drives the shaft 23 by way of the gears 17, 25 when the gear 25 can transmit torque to the shaft 23 (this is the first gear (1) of the transmission 15). The second gear (2) is engaged or active when the gear 26 drives the shaft 23 and receives torque from the shaft 14 by way of the gear 18. The third gear (3) is established (i.e., it is in use) when the gear 27 drives the shaft 23 and receives torque from the shaft 14 via gear 19; the fourth gear (4) is established when the gear 28 can rotate the shaft 23 and is driven by the shaft 14 via gear 20; and the fifth gear (5) is effective when the gear 30 can drive the shaft 23 and can receive torque from the gear 31 while the latter is driven by the electrical machine 50 (via rotor 51 and gears 51a, 52) and/or by the prime mover 11 (via crankshaft 12 and friction clutches 13, 32, i.e., by the torsional vibration dampers 16 and 32).

The gear 5 is the highest forward gear of the transmission 15.

The gear 31 can receive torque from the torsional vibration damper 33 (such as a composite flywheel) forming part of the disc clutch (load clutch) 32. The latter is installed in a housing 32A further accommodating the disc clutch 13 having one set of its laminae connected to the crankshaft 12 and the other set of such laminae affixed to the input shaft 14.

The clutch which can transmit torque between a gear 41 affixed to the output shaft 23 and the gear 25 or 35 includes an internally toothed sleeve 36 which is movable between the illustrated neutral position and two operative positions or end positions by a suitable actuator, not shown, e.g., by an electrical, pneumatic or hydraulic actuator. The connection between the actuator and the sleeve or coupling 36 comprises a kinematic motion transmitting means such as a shift lever, a shaft, a gearing or the like, not shown. Suitable synchronizing units 42 and 43 are interposed between the sleeve or clutch 36 on the one hand, and the gears 25, 35 on the other hand. The gears R and 1 are the two starting (reverse and forward) gears of the transmission 15.

A second axially movable sleeve or clutch 37 is provided to connect a gear 40 on the output shaft 23 of the transmission 15 with the gear 26 (second forward gear 2) or with the gear 27 (third forward gear 3), and a third axially movable sleeve or clutch 38 is provided to connect a gear 39 on the output shaft 23 with the gear 28 (fourth forward gear 4) or with the gear 30 (fifth forward gear 5) in response to motion being transmitted thereto by two additional mechanical or fluid-operated actuators. The power train 10 does not employ synchronizers (such as 42 and 43) between the gears 40 and 26, 27 or 39 and 28, 30. Synchronization of the forward gears 2, 3 and 4, 5 is effected by crossover coupling of clutches 13, 32 and/or by braking or acceleration of the electrical machine 50.

The power trains 110, 210, 310 and 410 which are shown in FIGS. 2, 3, 4 and 5, respectively, differ from the power train 10 primarily in the designs and circuitries of their respective electrical machines and in that their transmissions or gearboxes 115, 215, 315 and 415 further comprise additional (highest) forward gears 6. The power trains 110, 210, 310, 410 also differ from each other in the modes of installing or accommodatming the components which can shift into the forward gears 6.

Referring again to FIG. 1, the rotor 51 of the electrical machine 50 is directly coupled to the load clutch 32 by way of the gear train 51a, 52, 31. Such gear train constitutes but one of several operative connections which can be utilized to transmit torque between the clutch 32 and the electrical machine 50. The purpose of the intermediate gear 52 is to increase the transmission ratio between the rotor 51 and the clutch 31. The illustrated connection between the electrical machine 50 and the gear 31 ensures that the machine 50 is driven by or drives the output shaft 23 when the transmission 15 is shifted into the forward gear 5, i.e., the transmission ratio is constant not only when the motor vehicle is driven by the output shaft 23 but also in the event of recuperation (i.e., when the shaft 23 transmits kinetic energy to the transmission 15).

The motor vehicle is started when the three sleeves or couplings 36, 37 and 38 assume their illustrated neutral positions and the clutch 32 is engaged. The gears R and 1 to 5 are not engaged. This is of advantage because the electrical machine 50 is being charged while the motor vehicle is at a standstill but the combustion engine 11 is on and the condition of the electrical energy storing means is unsatisfactory.

In the recuperation mode, the clutches 13, 32 are preferably also disengaged and the transmission 15 is shifted into the gear 5 by moving the sleeve 38 to the left, i.e., to transmit torque between the gears 30 and 39, namely between the output shaft 23 and the gear 31. The same setting is selected when the combustion engine 11 is off and the output shaft 23 is driven only by the electrical machine 50. If the motor vehicle is driven by the combustion engine 11, the electrical machine 50 can generate current; the clutch 32 is then disengaged and the transmission 15 is shifted into the gear 5. In addition to or in lieu of generating current, the electrical machine 50 can assist the combustion engine 11 in driving the motor vehicle. If the transmission is shifted into one of the gears 1 to 4 and R, the electrical machine 50 can be coupled with the combustion engine 11 by way of the clutch 32 and crankshaft 12 so that the machine 50 can be driven directly by the crankshaft 12 (generator operation) or can transmit torque to the input shaft 14 (driving mode).

During shifting between the gears 1 to 4, the clutch 32 can be operated with slip and the sleeve 38 couples the gear 39 with the gear 30 (i.e., the transmission 15 is in gear 5) so that, while the transmission of power from the prime mover 11 to the output shaft 23 is interrupted as a result of shifting out of a gear and prior to shifting into a different gear, the output shaft 23 receives torque by way of the gear 5. This ensures that the wheels of the motor vehicle receive reduced torque during shifting of the transmission 15 into a different gear. Alternatively, or in addition to such mode of operation, the electrical machine 50 can transmit torque to the input shaft 14 of the transmission 15 so that the clutch 32 can remain fully disengaged in the course of the gear shifting operation and, at such time, the combustion engine 11 does not transmit torque to output shaft 23 of transmission 15.

In order to ensure that, during deceleration of the motor vehicle, the kinetic energy which the normally driven wheel or wheels then transmits or transmit to the output shaft 23 of the transmission 15 and thence to the electrical machine 50, or to the rotor 51 in the course of mechanical recuperation (the rotor can comprise a flywheel which can increase the maximum usable moment of inertia for the storage of rotational energy), the clutches 13 and 32 are disengaged and the gear of the fifth gear 5 of the transmission 15 is connected to the output shaft 23. The transmission ratio which is established between the gear 31 and the rotor 51 ensures that the rotor is accelerated accordingly even at a low RPM of the output shaft 23. In accordance with a feature of the invention, a slowing down of the motor vehicle entails a mechanical or electrical recuperation in dependency upon the starting (deceleration preceding) speed, the deceleration gradient, the load borne and/or towed by the vehicle, the extent to which the source of electrical energy is charged, and/or certain other variables.

In the case of mechanical recuperation, only the rotor 51 and its flywheel (if provided) are accelerated to store rotational energy. In this connection, it can be of advantage to engage the gear 5 while the motor vehicle is at a standstill so that the rotor 51 is free to turn in accordance with the energy utilizing principle and, if necessary, to restart the combustion engine 11 upon engagement of the clutch 32. The engine 11 is preferably turned off immediately upon stoppage of the motor vehicle or during coasting following disengagement of the clutch 13. Still further, it can be of advantage, especially at a high RPM of the rotor 51, to connect the electrical machine 50 for operation in the generator mode until the RPM of the rotor 51 is reduced due to electrical work of the machine 50 so that one can ensure a substantially friction-free engagement of the clutch 32. It will be appreciated that the RPM of the rotor 51 is reduced only to the extent which ensures that the combustion engine 11 is started while still warm. Electrical recuperation during deceleration of the motor vehicle utilizes the same path which is utilized for mechanical recuperation but with the difference that the electrical machine 50 is operated in generator mode so that it generates electrical energy which is stored in an electrical storage facility and/or is supplied to one or more consumers of electrical energy. Such consumer or consumers can constitute and normally or often constitute means related or pertaining to safety of the motor vehicle and/or to comfort of the occupant(s).

It can be of advantage, especially when the motor vehicle is at a standstill, to convert the energy which is stored in the rotor 51 into electrical energy, i.e., to generate electrical energy for utilization by one or more consumers; this prevents undue stressing of the storage facility (such as one or more batteries).

Figure 2:
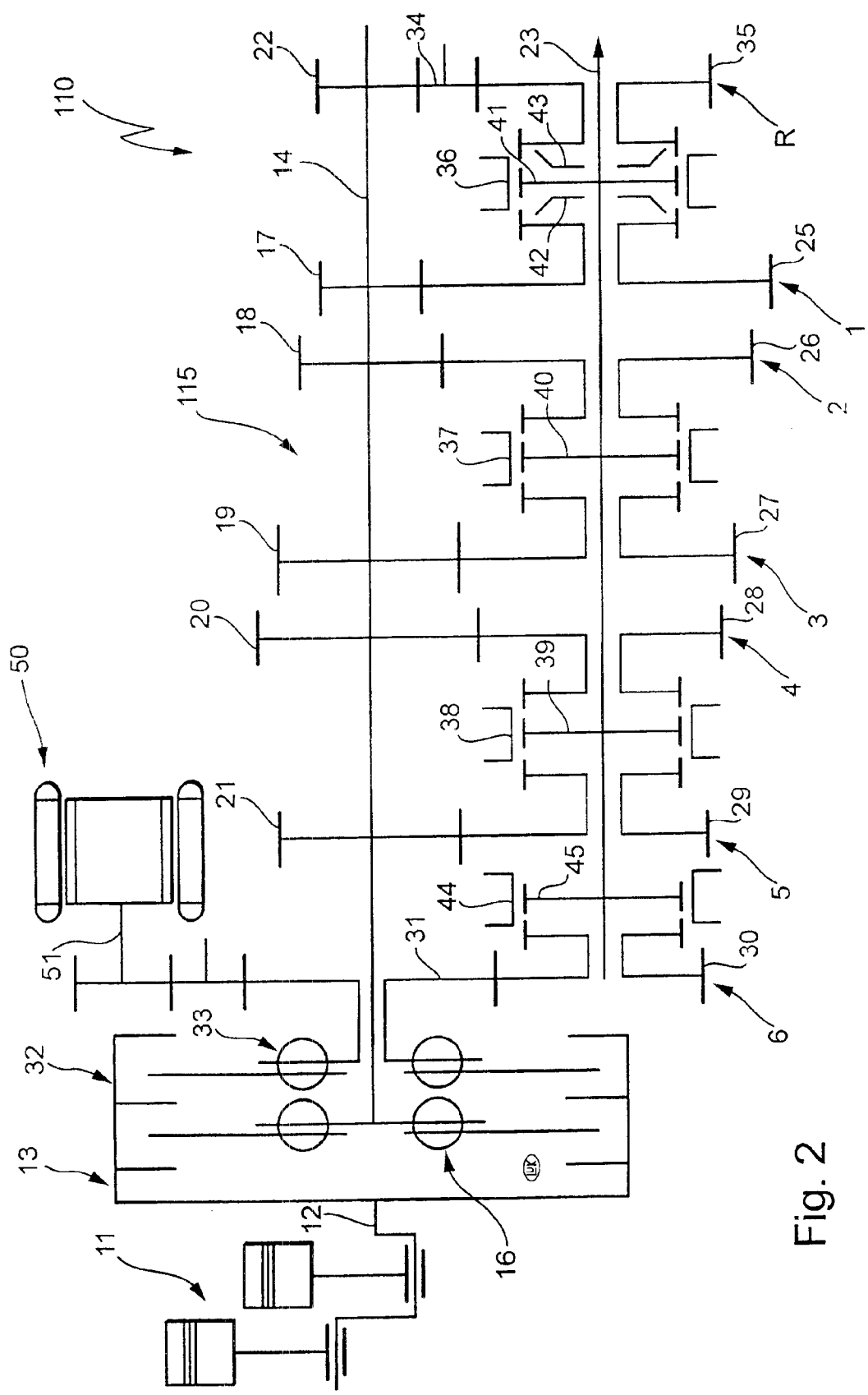
FIG. 2 is a similar schematic representation of a power train which constitutes a modification of the power train shown in FIG. 1.

All such parts of the power train 110 shown in FIG. 2 (with the exception of the transmission 115) which are identical with or plainly analogous to those in the power train 10 of FIG. 1 are denoted by similar reference characters and will be referred to again only to the extent required and necessary to contribute to a better understanding of operation of the power train 110 and of its hybrid drive. The preceding remarks also apply for the power trains 210, 310 and 410 (as well as for their transmissions 215, 315 and 415) which are respectively shown in FIGS. 3, 4 and 5.

The transmission 115 of the power train 110 can shift into a total of seven gears, namely a reverse gear R and six forward gears 1 to 6. Shifting into the gear 6 is made possible due to the provision of a loose gear 45 fixed to the output shaft 23, by the provision of a gear 29 which is rotatably mounted on the output shaft 23 in lieu of the gear 30 of FIG. 1, and by a sleeve or clutch 44 which is operable by an actuator (not shown) to transmit torque between the gears 30, 45 or to disengage such gears from each other. The connection between the electrical machine 50 and the gear 30 of FIG. 2 is the same as that shown in and already described with reference to FIG. 1 except that the gear 30 of FIG. 2 serves to engage or disengage the gear 6 of the transmission 115.

Figure 3:
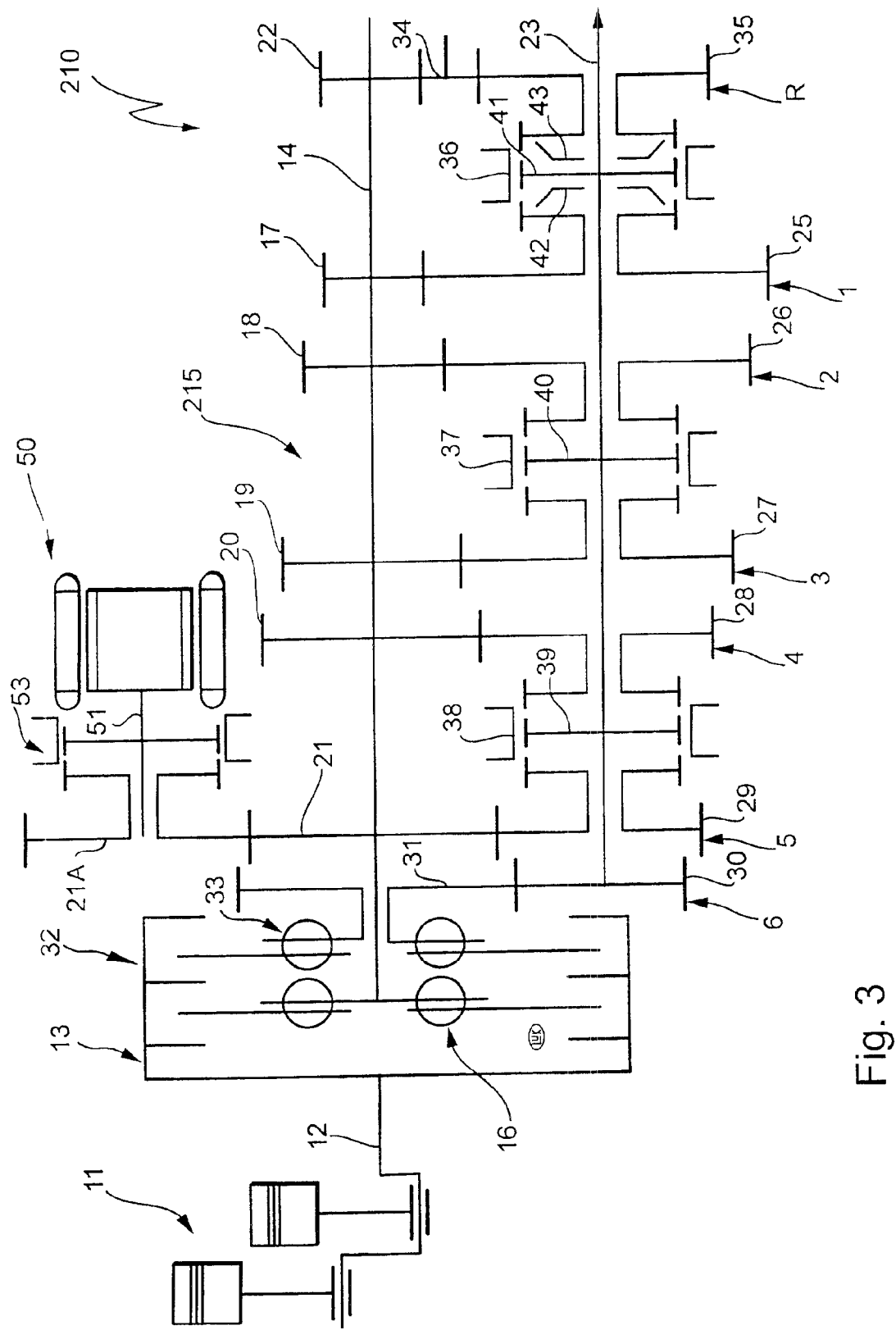
FIG. 3 is a schematic representation of a power train which constitutes a first modification of the power train shown in FIG. 2.

The power train 210 of FIG. 3 employs a transmission 215 which is shiftable into reverse gear R and any one of six forward gears 1 to 6. The structure which is shown in FIG. 3 further comprises a clutch 53 which can be engaged or disengaged by its sleeve or coupling to engage the rotor 51 with or to disengage the rotor from a dividing gear 21 affixed to the input shaft 14 of the transmission 215. The gear 21 mates with the gear 29 as well as with a gear 21a which drives the rotor 51 or is disengageable from the rotor by the clutch or sleeve 53. The gear 21 forms part of means for shifting into the gear 5 into which the transmission 215 is shiftable by the sleeve 38 which then transmits torque between the gear 29 (meshing with the gear 21) and the gear 30 on the output shaft 23.

An advantage of the power train 210 of FIG. 3 is that, during shifting of the transmission 215 into different gears (e.g., from gear 2 into gear 3), the rotor 51 can be disengaged from the parts which establish the gear 5 so that the inertia of the rotor (such inertia should be rather high for the purpose of mechanical recuperation but vould have a negative effect upon the synchronizing operations in the course of shifting into different gears) does not exert an adverse influence upon the synchronization. However, when necessary, the electrical machine 50 can assist in shifting of the transmission 215 into different gears by accelerating or decelerating the input shaft 14. Furthermore, the electrical machine 50 can accelerate or decelerate the output shaft 23 by way of the gear 29, sleeve 28 and gear 39 when the disc clutch 32 is disengaged.

Figure 4:
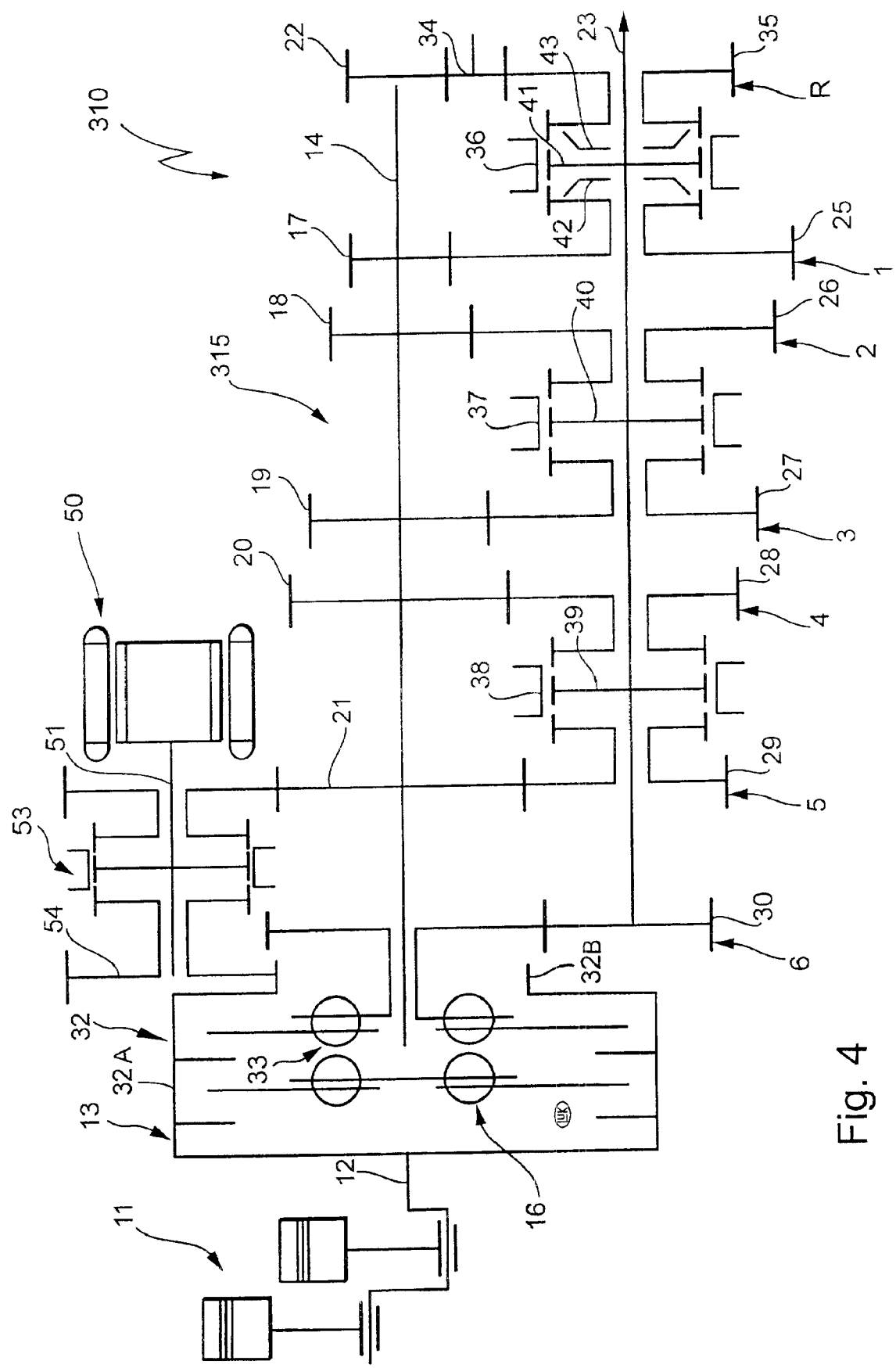
FIG. 4 is a schematic representation of a power train constituting a second modification of the power train illustrated in FIG. 2.

The power train 310 of FIG. 4 differs from the power train 210 of FIG. 3 in that the clutch 53 is actuatable to couple the rotor 51 of the electrical machine 50 with the gear 21 (i.e., with the input shaft 14 of the transmission 315) to set the transmission 315 into the gear 5 or with a gear 54 which is in mesh with a gear 32B on the common housing 32A of the clutches 13 and 32; in the second instance, the electrical machine 50 is coupled directly to the output shaft (crankshaft) 12 of the combustion engine 11. It is clear that the clutch 53 can further assume a neutral position or condition in which the clutch is incapable of transmitting torque between 51 and 21a as well as between 51 and 54.

An advantage of the embodiment of FIG. 4 is that, especially during standstill and at an unsatisfactory charging of the battery or batteries, the electrical machine 50 can be directly connected with the combustion engine 11 so that, for example, in a stop-and-go traffic, the battery or batteries can be directly recharged. To this end, the combustion engine 11 remains operative while the motor vehicle is at a standstill and drives the electrical machine 50 in the generator mode. Such direct connection to the crankshaft 12 exhibits the advantage (over a connection of the rotor 51 by way of the engaged clutch 32, see FIGS. 1 to 3) that it involves a pronounced reduction of losses, such as friction losses, and that it takes more effectively advantage of the RPM range of the combustion engine, especially while the motor vehicle is at a standstill, while the motor vehicle is being set in motion and while the motor vehicle is driven at a relatively low speed.

Figure 5:
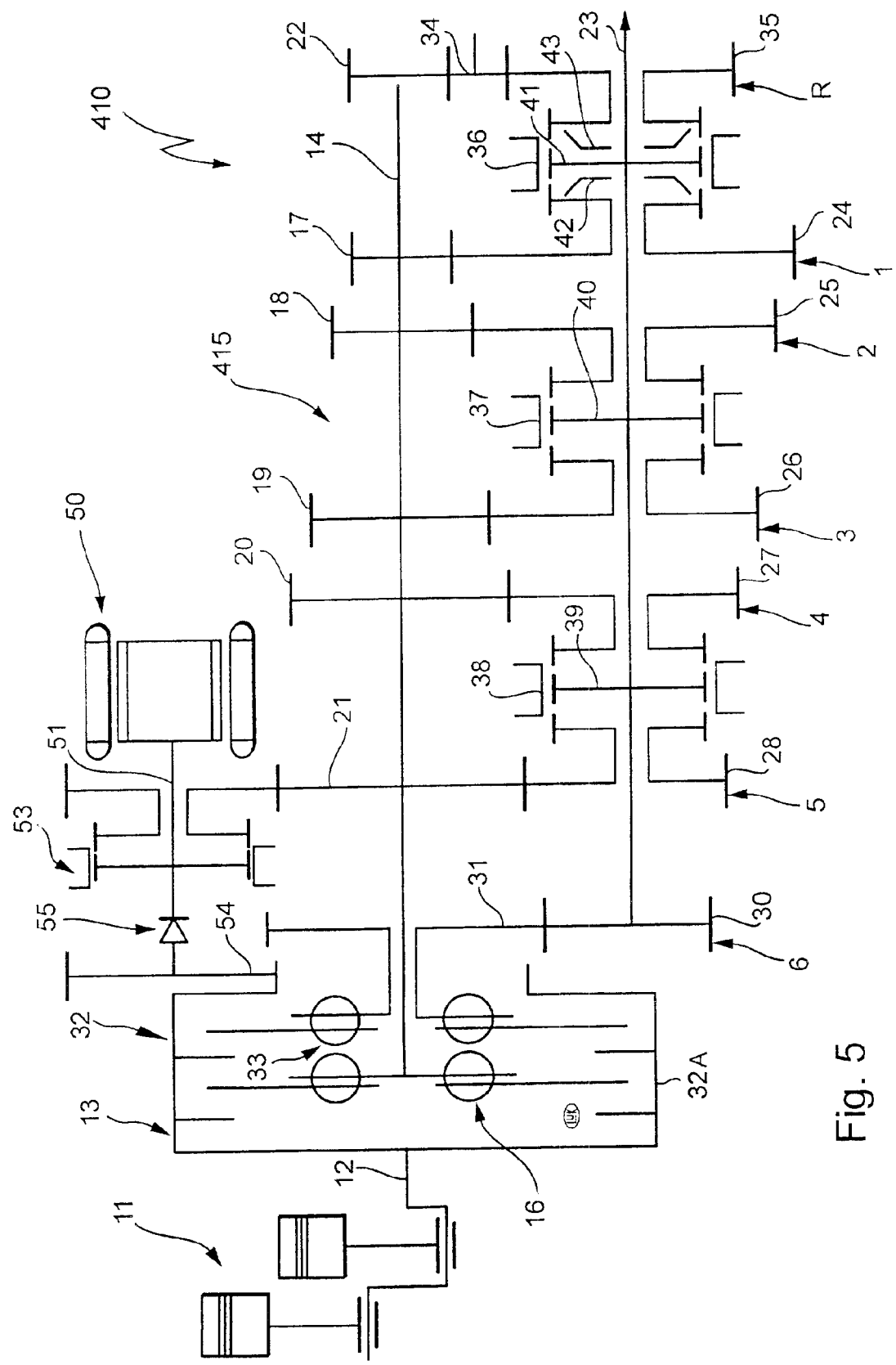
FIG. 5 is a schematic representation of a power train which constitutes a third modification of the power train depicted in FIG. 2.

FIG. 5 shows a power train 410 having a transmission 415 with a reverse gear R and six forward gears 1 to 6. This transmission is similar to the transmission 315 of FIG. 4 with certain exceptions including that the connection between the electrical machine 50 and the gear 5 of the transmission 415 can be interrupted and that a freewheel 55 is provided between the clutch 53 (i.e., between the rotor 51 of the electrical machine 50) and the gear 54 on the common housing 32A of the clutches 13 and 32. The freewheel 55 can transmit torque in the direction from the crankshaft 12 of the combustion engine 11 to the rotor 51 of the electrical machine 50. Therefore, the axially shiftable element of the clutch 53 is or can be designed and can operate in such a way that it separates only the rotor 51 from the input shaft 14 of the transmission 415.

Figure 6:
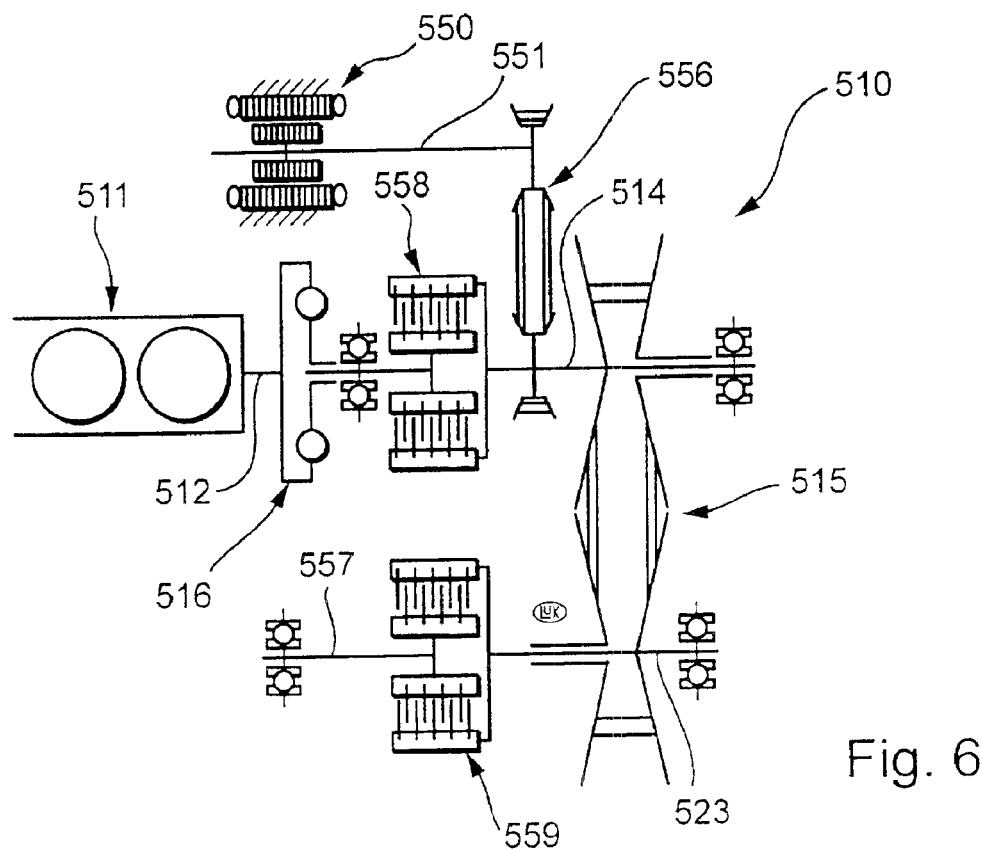
FIG. 6 is a fragmentary schematic illustration of a power train wherein the transmission with a limited number of gears or gear ratios is replaced with a continuously variable transmission.

Referring to FIG. 6, the power train 510 which is shown therein includes an internal combustion engine 511 or another suitable prime mover and a (CVT) transmission 515 having a continuously variable transmission ratio and being installed between the input shaft 514 and the output shaft 523. The means for varying the ratio of the CVT transmission 515 comprises a first adjustable pulley on the input shaft 514, a second adjustable pulley on the output shaft 523, and an endless flexible belt or chain trained over the two pulleys. Each pulley comprises an axially fixed flange and an axially movable flange. Reference may be had, for example, to commonly owned U.S. Pat. No. 5,169,365 granted Dec. 8, 1992 to Friedmann for "POWER TRAIN" and/or to German patent No. 40, 36 683 A1.

The electrical machine 550 in the power train 510 of FIG. 6 is connected with the input shaft 514 of the CVT transmission 515; its rotor 551 is coupled to the input shaft 514 by a coupling including pulleys on the rotor 551 and the shaft 514 as well as an endless flexible element (belt, chain or the like) trained over such pulleys. The just described pulleys and the endless flexible element can constitute a second CVT transmission analogous to that shown at 515. A torsional vibration damper 516 is installed between the output shaft 512 (such as a crankshaft) of the combustion engine 511 and the input shaft 514 of the CVT transmission 515; such damper can constitute or include a split flywheel. Clutches (such as wet running clutches) 558 and 559 are provided to respectively engage the output shaft 512 with or to disengage this output shaft from the input shaft 514, and to engage the output shaft 523 with or to disengage the shaft 523 from an output 557.

The mode of operation of the power train 510 is analogous to that of the power train 10 of FIG. 1. This applies particularly for the operation and the purpose of the clutches 558, 559 and the gearing 515. The combustion engine 510 is started when the clutches 558 and 559 are respectively engaged and disengaged, and such starting of the combustion engine is effected by the electrical machine 550 and by way of the transmission 515. If the transmission 515 is a CVT transmission, it is advisable to select for the electrical machine a high RPM and a correspondingly selected transmission ratio for a starting of the combustion engine 511.

The vehicle is driven by the engine 511 while the clutches 558, 559 are engaged, and the desired acceleration and speed of the vehicle are determined by appropriate selection of the ratio of the transmission 515. Alternatively, or in addition to the just described starting of the combustion engine 511, the motor vehicle can be accelerated or driven by the electrical machine 550 by way of the belt drive 556. In order to decelerate the vehicle, the clutch 558 is disengaged and the combustion engine is stopped.

In order to slow down the vehicle, the clutch 559 is engaged and the circuit of the electrical machine is completed to start an electrical recuperation. Alternatively, and depeding upon the driving circumstances, the electrical machine 550 is arrested and the recuperation proceeds only mechanically. When the vehicle comes to a halt, the clutch 559 can be disengaged and the rotor 551, as well as the components which are operatively connected therewith, can be utilized as an energy utilizing clutch of inertia flywheel clutch. The thus stored rotational energy can be converted into electrical energy by supplying current to the electrical machine 550 for conversion into electrical energy or to be available for a renewed start of the internal combustion engine in response to engagement of the clutch 558. Furthermore, and in the event of a deceleration of the motor vehicle with desired purely mechanical recuperation, it is of advantage to shift the transmission into rapid, i.e., into overdrive, so that when the RPM of the output shaft 514 is low, the RPM of the rotor 551 of the electrical machine 550 is high with the result that one can store substantial amounts of electrical energy. If the belt drive 556 is adjustable, this drive can also be adjusted in rapid. On he other hand, if electrical recuperation is desired, the ratio of the transmission 556 and possibly also that of the belt drive 556 can be selected in such a way that the electrical machine 550 is operated with optimal efficiency.

Figure 7:
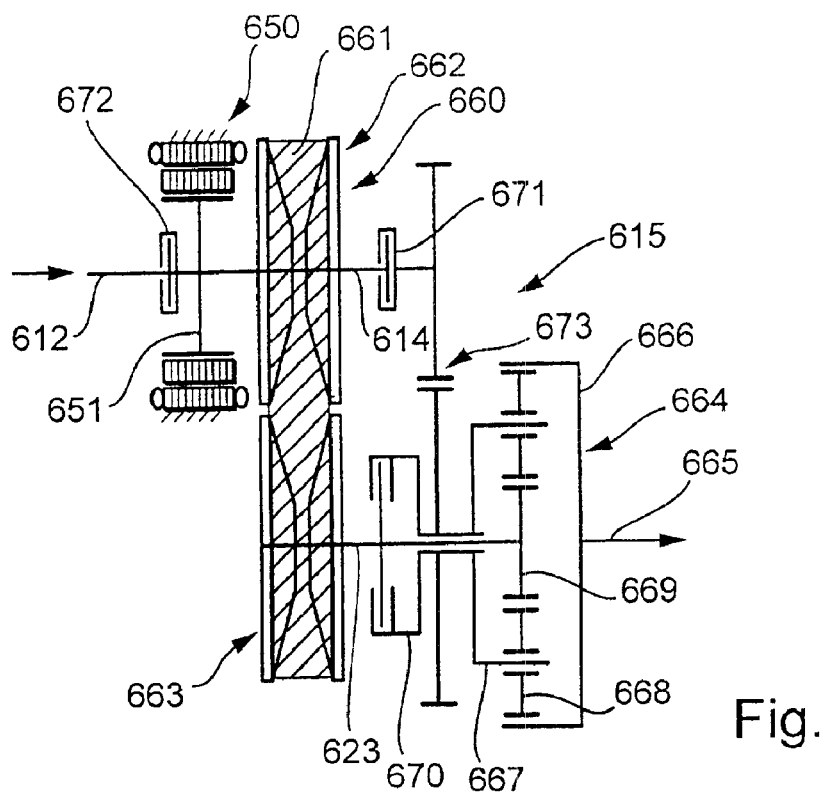
FIG. 7 shows a portion of a power train similar to that of FIG. 6 but employing a geared-neutral transmission in lieu of the continuously variable transmission.

Referring to FIG. 7, there is shown an advantageous embodiment of a power train with a transmission 615 and an electrical machine 650. The transmission 615 is a so-called geared-neutral transmission and comprises a CVT transmission 660 with a pulley 662 on the input shaft 614, with a pulley 663 on the output shaft 623, and with an endless flexible element (such as a chain or belt) 661 trained over the two pulleys. A planetary 664 connects the output shaft 623 with a further output shaft 665 which can drive one or more wheels of the motor vehicle or a differential.

The planetary 664 has an internal gear 666 affixed to the output shaft 665, planet pinions 668 mating with the internal gear 666 and with a sun gear or wheel 669 on the output shaft 623 of the transmission 615, and a planet carrier 667 mounting the planetary pinions 668 and rotatable relative to the output shaft 623. The planet carrier 667 can be connected with the input shaft 614 of the CVT transmission 660 by a first clutch 671, and with the output shaft of the CVT by a second clutch 670. FIG. 7 further shows the crankshaft (output element) 612 of the combustion engine (not shown in FIG. 7); this crankshaft 612 can be connected with the input shaft 614 in response to engagement of a clutch 672.

The rotor 651 of the electrical machine 650 is fixedly secured to the input shaft 614 of the CVT transmission 660; this rotor is coupled to the crankshaft 612 in response to engagement of the clutch 672. The output shaft 665 is operatively connected with the rotor 651 in response to disengagement of the clutches 670 and 671 directly by way of the CVT transmission 660 or along a branch path, when the clutch 671 is engaged, by way of the CVT transmission 660 and a gear connection or gear train 673 between the input shaft 614 and the planet carrier 667, planet pinions 668 and internal gear 666 to the output shaft 665.

By selectively engaging the clutches 670, 671, one can achieve a transmission range which is much wider than that achievable with conventional CVT transmissions wherein the maxium transmission ratio i (inclusive of transmission in the differential) is approximately 14. In this manner, when the driven wheel(s) of the motor vehicle transmits or transmit torque to the output shaft 665, when the clutch 670 is engaged, and when the CVT transmission 660 is in underdrive, one can select a very high transmission setting at the rotor 651 with attendant acceleration thereof; such high RPM allows for the storage of large amounts of rotational energy. For example, one can reach RPM's of up to 16,000; however, it is to be taken into consideration that the thus obtainable additional rotational energy might not be worth the additional expenditures for the utilization of a rotor 651 having the requisite bursting strength at such elevated RPM.

It is further worthy of consideration that the transmission 615 is a geared-neutral transmission and that, when the clutch 670 is engaged and the CVT transmission 660 is shifted into underdrive gear, a reversal of the transmission ratio takes place, i.e., such reversal point should not be reached during shifting into underdrive gear.

Figure 8:
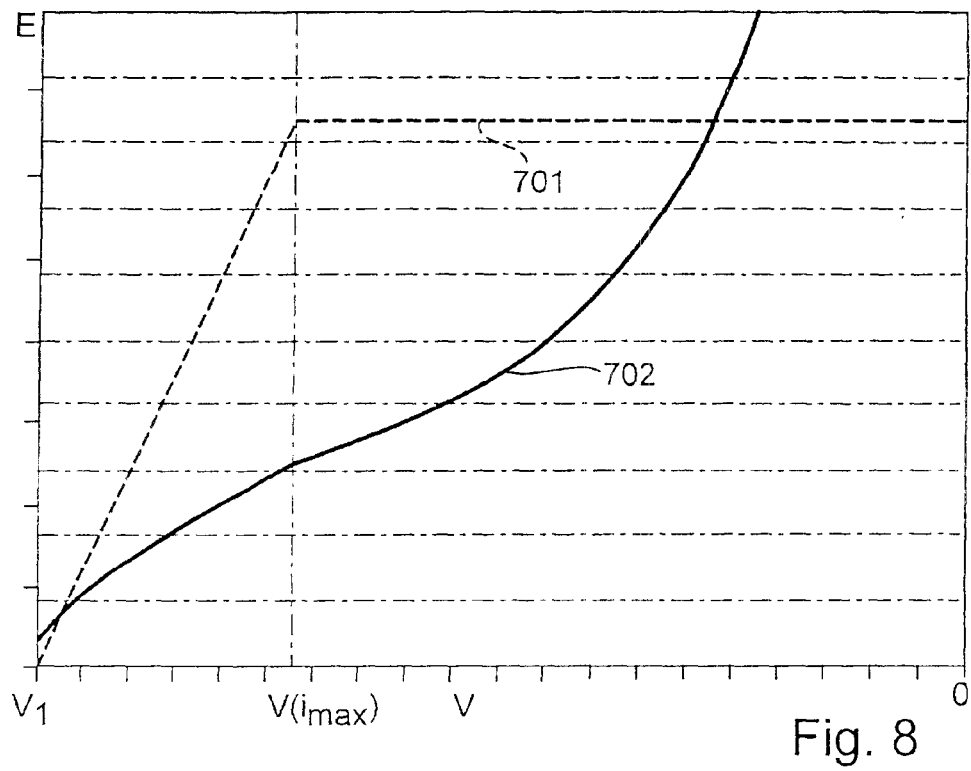
FIG. 8 is a coordinate system with curves denoting the recoverable energy in dependency upon the mode of operation of one embodiment of the improved power train with hybrid drive.
Figure 9:
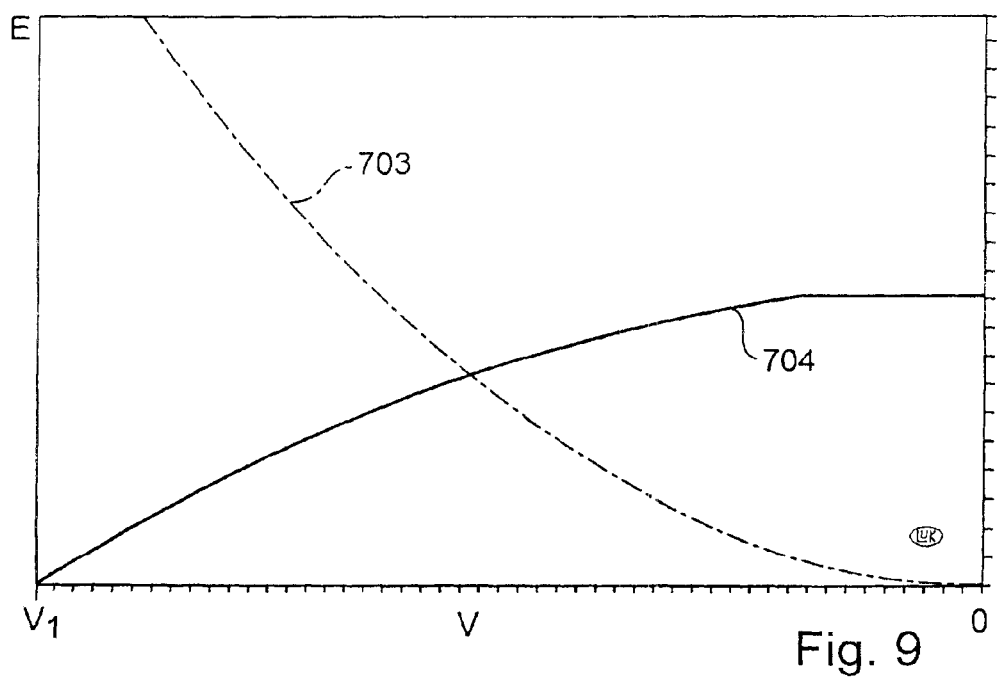
FIG. 9 is a coordinate system with curves denoting momentary and accumulated amounts of recuperable energy.

FIGS. 8 to 11 illustrate coordinate systems wherein the energy E is measured along the ordinate and the decreasing velocity v of the vehicle during a recuperation stage is measured along the abscissa. Referring first to FIG. 8, the broken-line curve 701 denotes the progress of the mechanically recuperated energy E while the velocity v decreases when the recuperation progresses. The velocity v decreases from a starting value $V_1$ to a standstill at v=0 while the overall ratio i of a CVT transmission varies from overdrive in a direction toward underdrive (see the solid-line curve 702). When the recuperation is started at the velocity $v_1$, e.g., 100 kilometers per hour, the energy increases linearly until the maximum transmission ratio is reached, e.g., at a velocity $v(i_{max})$. When the velocity $v(i_{max})$ is reached, a further acceleration of the flywheel (which takes up the kinetic energy and stores it in the form of rotational energy) is no longer possible. However, the quantity of recuperable energy at a maximum transmission ratio i, e.g., when i=14, is a multiple of the capacity of electrical machines which can be produced at an economically acceptable cost and/or designed in an energetically warranted manner. The output of an electrical machine does not exceed the range of between 15 and 25 kilowatts.

The progress of the curve 702 at speeds exceeding $v(i_{max})$, e.g., when one utilizes geared-neutral transmissions, indicates that the energy curve 701 could slope upwardly at a constant rate starting at the point $v(i_{max})$ to indicate even greater recuperable energies. This would necessitate the utilization of a flywheel exhibiting a greater bursting strength and hence a determination whether it is worth to incur higher costs for such flywheel in order to achieve a somewhat higher obtainable energy potential.

It is to be noted here, for the sake of completeness, that in the coordinate system of FIG. 8 the energy E in the curve 701 denotes the amount of energy during a deceleration process from the velocity v and $v(i_{max})$, i.e., that the energy between these two velocities is to be considered integratingly and that, at decreasing velocities and at maximum transmission ratios, no additional energy can be recovered until the motor vehicle comes to a standstill. The curve 701 further indicates the progress of a recuperable quantity of energy E for a transmission which reaches its maximum ratio at the velocity point $v(i_{max})$.

The curves in the coordinate system of FIG. 9 again indicate changes of energy E as a function of reduction of velocity v. The starting velocity is shown at $v_1$ and the zero velocity upon completion of an electrical recuperation is shown at 0. The curve 703 is indicative of the momentary amount of energy which is recuperable at a given velocity v, and the curve 704 is indicative of the accumulated amount of energy E at a selected velocity v. Thus, the maximum recuperable energy is indicated at the right-hand end of the curve 704, i.e., when the velocity is zero. For example, such value can be optimized by shifting the transmission, especially if the power train employs a CVT transmission; to this end, the transmission ratio can be selected in such a way that the electrical machine is always operated with optimum efficiency.

Figure 10:
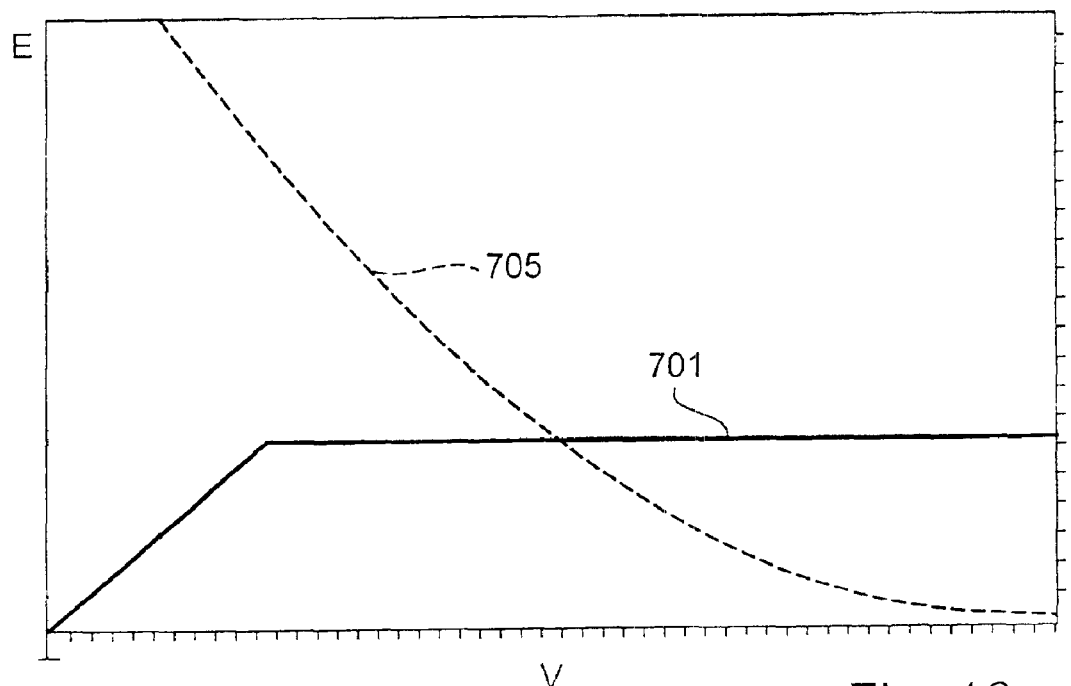
FIG. 10 is a coordinate system with curves denoting other aspects of energy recuperation in accordance with one of several embodiment of the present invention.

FIG. 10 illustrates changes of energy E in dependency upon changes (reduction) of velocity v, namely within the range of between v and v=0 for mechanical recuperation whereby the energy E changes in a manner as indicated by the curve 705 and the amount of energy increases in a manner as indicated by the curve 701. It is to be noted that the scale of FIG. 9 need not be the same as that of FIG. 10.

Figure 11:
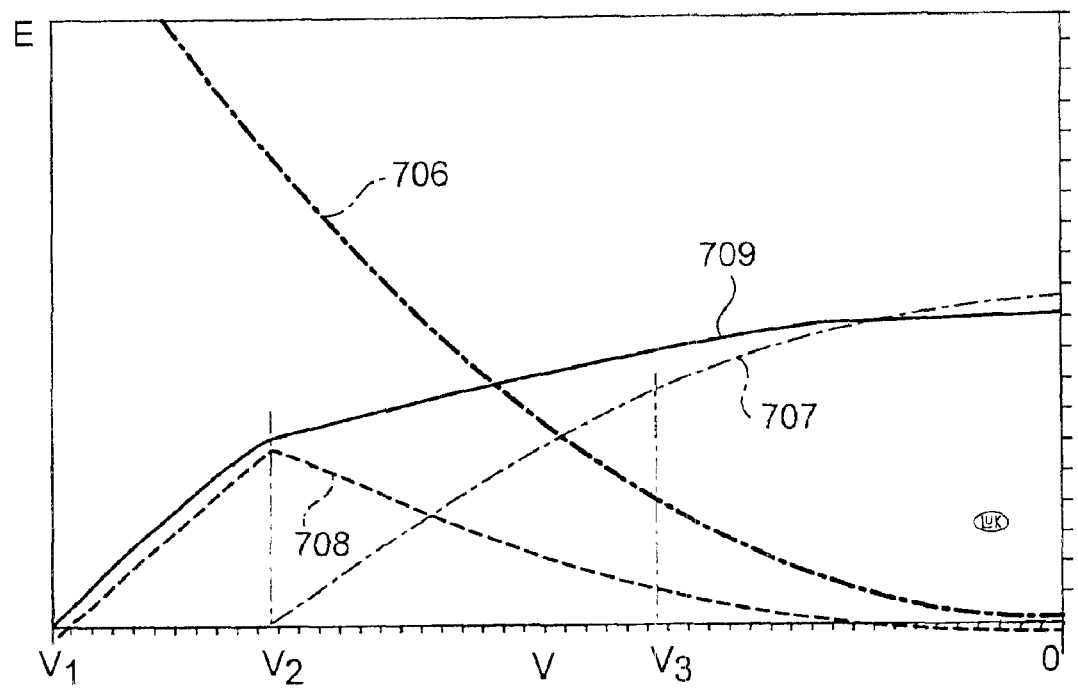
FIG. 11 is a coordinate system with curves denoting other aspects of energy recuperation by resorting to the method and power train with the hybrid drive embodying our invention.

The coordinate system of FIG. 11 illustrates the progress of energy E as a function of decreasing velocity v of the motor vehicle, namely from $v_1$ to 0. Such energy is obtained as a result of combined mechanical and electrical recuperation. The curve 706 denotes the kinetic energy of the motor vehicle; such energy decreases with progressing slowing down of the vehicle. The curve 707 is indicative of the electrically recuperable energy, and the curve 708 indicates the progress of the mechanically recuperable energy. Finally, the curve 709 is indicative of the sum of mechanically and electrically recuperable energies.

In the energy recovery operations represented by the curves shown in FIG. 11, the selection of electrical and mechanical recoveries is carried out in such a way that, at the onset of recuperation, the recuperation is strictly mechanical, i.e., the rotor of the electrical machine or an equivalent flywheel (such as a rotor which carries a flywheel) is initially accelerated to a maximum RPM. At the same time, a transmission (such as a CVT transmission, a geared-neutral transmission or a mechanical transmission) is shifted into highest gear, namely into underdrive. When the maximum RPM is reached and the velocity of the vehicle is $v_2$, the electrical machine is set in operation (i.e., its circuit is completed). This entails a rise of electrically recuperable energy and simultaneous gradual reduction of the mechanically stored energy (e.g., in the form of rotational energy). The curve 709, which represents the sum of both energy forms, indicates that the combined value of the two energies is higher at v=0 than during deceleration of the vehicle with only mechanical or only electrical recuperation.

In accordance with a further presently preferred embodiment, electrical recuperation can be arrested, e.g., at a velocity $v_3$ (see FIG. 11) and a clutch between the driven vehicle wheels and the flywheel is disengaged so that the flywheel continues to rotate and the combustion engine (which might have been turned off) can be started by engaging a clutch between the engine and the flywheel. It will be appreciated that the selection of the velocity $v_3$ need not necessarily depend upon the speed of the motor vehicle but can be selected, in a desirable manner, as a function of the RPM of the fly-wheel.

Figure 12:
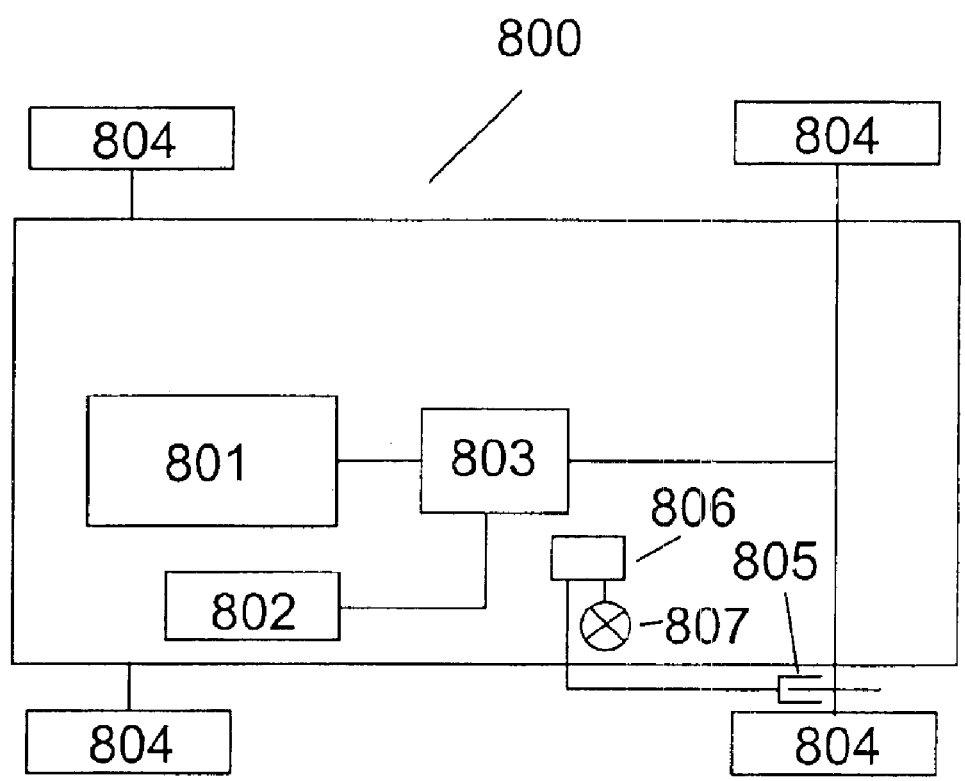
FIG. 12 represents a block diagram of a motor vehicle using one of the power trains of FIGS. 1 through 7.

The block diagram of FIG. 12 represents a motor vehicle 800 that incorporates a power train according to one of the embodiments illustrated in FIGS. 1 through 7. An engine 801 and/or electrical machine 802 can be coupled by way of one or more transmissions 803 to one or more of the wheels 804. A vehicle brake 805 acting on one or more of the wheels 804 is connected to a brake pedal 806. A pressure-responsive sensor 807 is operatively connected to the brake pedal 806 and produces a signal representative of the amount of force being applied to the brake pedal 806.

Transmissions of the class to which the transmissions in the power trains of the present invention pertain are disclosed, for example, in U.S. Pat. No. 6,209,407 B1 granted Apr. 3, 2001 to Heinzel et al. for "TOOTHED GEAR TRANSMISSION HAVING TWO PARTIAL TRANSMISSIONS DISPOSED PARALLEL TO EACH OTHER IN THE POWER FLOW".

Applicants are further aware of disclosures in U.S. Pat. No. 5,895,333 (granted Apr. 20, 1999 to Morisawa et al. for "HYBRID VEHICLE DRIVE SYSTEM, WHEREIN MECHANISM FOR SYNTHESIZING ENGINE AND MOTOR OUTPUTS IS DISPOSED ADJACENT TO TRANSMISSION"), U.S Pat. No. 6,019,698 (granted Feb. 1, 2000 to Lawrie et al. for "AUTOMATED MANUAL TRANSMISSION SHIFT SEQUENCE CONTROLLER"), and U.S. Pat. No. 6,059,059 (granted May. 9, 2000 to Schmidt-Brücken for "DRIVE ARRANGEMENT FOR A MOTOR VEHICLE").

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of power trains with hybrid power sources and, therefore, such adaptations should and are intended to be comprehended within the meaning and range of equivalence of the appended claims.

What is claimed is:

1. A power train for moving a vehicle during different stages of operation, comprising:
   at least one internal combustion engine with a crankshaft;
   at least one electrical machine connectable with said engine and arranged to function as a motor and as a generator; and
   at least one countershaft transmission interposed between said engine and at least one wheel of the vehicle and being shiftable into a plurality of gears in dependency upon the operating conditions of the vehicle, said conditions including:
   a traction condition involving propulsion of the vehicle by at least one of said engine and said machine, a coasting condition involving a deceleration of the vehicle which entails a conversion of kinetic energy developing as a result of deceleration of the vehicle into at least one of electrical energy and rotational energy, wherein said electrical energy is stored in at least one electrical storage facility and said rotational energy is stored in at least one rotatory mass, a cold starting condition involving a starting of cold engine by said machine, and a warm starting condition, wherein the engine, while still hot due to a previous operation, is restarted by one of said machine and said rotatory mass, which for said restarting is rotationally coupled to the crankshaft, in order to use said stored rotational energy for the restarting, wherein said transmission has a rotary input shaft, said rotatory mass including a fly-wheel connectable to and disconnectable from said crankshaft and said rotary input shaft.

2. The power train of claim 1, wherein said flywheel is a rotor of said electrical machine.

3. A power train for moving a vehicle during different stages of operation, comprising:

at least one internal combustion engine with a crankshaft;

at least one electrical machine connectable with said engine and arranged to function as a motor and as a generator; and at least one countershaft transmission interposed between said engine and at least one wheel of the vehicle and being shiftable into a plurality of gears in dependency upon the operating conditions of the vehicle, said conditions including:

a traction condition involving propulsion of the vehicle by at least one of said engine and said machine, a coasting condition involving a deceleration of the vehicle which entails a conversion of kinetic energy developing as a result of deceleration of the vehicle into at least one of electrical energy and rotational energy, wherein said electrical energy is stored in at least one electrical storage facility and said rotational energy is stored in at least one rotatory mass, a cold starting condition involving a starting of cold engine by said machine, and a warm starting condition, wherein the engine, while still hot due to a previous operation, is restarted by one of said machine and said rotatory mass, which for said restarting is rotationally coupled to the crankshaft, in order to use said stored rotational energy for the restarting, wherein said coasting condition includes a first made of operating involving an acceleration of the rotatory mass in response to the application thereto of kinetic energy and a second mode of operation involving the utilization of said electrical machine for conversion of kinetic energy into electrical energy, wherein said modes of operation are selected as a function of different extents of deceleration of the vehicle.

4. The power train of claim 3, wherein the conversion of kinetic energy into electrical energy takes place as a result of relatively small deceleration of the vehicle and the conversion of kinetic energy into rotational energy takes place when the deceleration of the vehicle exceeds a predetermined threshold value.

5. The power train of claim 4, wherein said threshold value is adjustable.

6. The power train of claim 5, wherein said threshold value is between about 0.5 m/s$^2$ and 3 m/s$^2$.

7. The power train of claim 5, wherein said threshold value is between about 1 m/s$^2$ and 2 m/s$^2$.

8. The power train of claim 5, wherein said threshold value is adjustable by an operator of the vehicle in dependency upon desired deceleration.

9. The power train of claim 8, wherein said adjustable threshold value is dependent upon a signal derived from the mode of actuation of a brake pedal in the vehicle.

10. The power train of claim 9, wherein said signal is variable as a function of the magnitude of force e being applied to the brake pedal and said signal is generated by a pressure-responsive sensor associated with the brake pedal.

11. A power train for moving a vehicle during different stages of operation, comprising:

at least one internal combustion engine with a crankshaft;

at least one electrical machine connectable with said engine and arranged to function as a motor and as a generator; and at least one countershaft transmission interposed between said engine and at least one wheel of the vehicle and being shiftable into a plurality of gears in dependency upon the operating conditions of the vehicle, said conditions including:

a traction condition involving propulsion of the vehicle by at least one of said engine and said machine, a coasting condition involving a deceleration of the vehicle which entails a conversion of kinetic energy developing as a result of deceleration of the vehicle into at least one of electrical energy and rotational energy, wherein said electrical energy is stored in at least one electrical storage facility and said rotational energy is stored in at least one rotatory mass, a cold starting condition involving a starting of cold engine by said machine, and a warm starting condition, wherein the engine, while still hot due to a previous operation, is restarted by one of said machine and said rotatory mass, which for said restarting is rotationally coupled to the crankshaft, in order to use said stored rotational energy for the restarting, wherein the conversion of kinetic energy into electrical energy takes place as a result of relatively small deceleration of the vehicle and the conversion of kinetic-energy into rotational energy takes place when the deceleration of the vehicle exceeds a predetermined threshold value, said threshold value being selected adaptively as a function of at least one operational parameter.

12. A power train for moving a vehicle during different stages of operation, comprising:

at least one internal combustion engine with a crankshaft;

at least one electrical machine connectable with said engine and arranged to function as a motor and as a generator; and at least one countershaft transmission interposed between said engine and at least one wheel of the vehicle and being shiftable into a plurality of gears in dependency upon the operating conditions of the vehicle, said conditions including:

a traction condition involving propulsion of the vehicle by at least one of said engine and said machine, a coasting condition involving a deceleration of the vehicle which entails a conversion of kinetic energy developing as a result of deceleration of the vehicle into at least one of electrical energy and rotational energy, wherein said electrical energy is stored in at least one electrical storage facility and said rotational energy is stored in at least one rotatory mass, a cold starting condition involving a starting of cold engine by said machine, and a warm starting condition, wherein the engine, while still hot due to a previous operation, is restarted by one of said machine and said rotatory mass, which for said restarting is rotationally coupled to the crankshaft, in order to use said stored rotational energy for the restarting further comprising means for automatically shifting said transmission so that the engine is operated with minimal consumption of fuel and any output increase initiated by the operator of the vehicle involves the utilization of said electrical machine, wherein the overall output of the power train including the output of said engine during operation with minimal consumption of fuel combined with the output of said electrical machine is reproducible within a range which is selectable by the operator of the vehicle.

13. The power train of claim 12, wherein said overall output is a function of at least one parameter which influences the output of said electrical machine and involves, in the event of influencing the output of said electrical machine, a departure from an optimal approximation to minimal fuel consumption by said engine to an extent corresponding to reduction of the output of said electrical machine by the at least one parameter.

14. The power train of claim 13, wherein said parameter is a characteristic output curve dependent upon at least one of RPM and temperature of said electrical machine, the condition of an energy source for said electrical machine, and the temperature of an electronic circuitry which controls said electrical machine and supplies electrical energy thereto.

15. A power train for moving a vehicle during different stages of operation, comprising:

at least one internal combustion engine with a crankshaft;

at least one electrical machine connectable with said engine and arranged to function as a motor and as a generator; and at least one countershaft transmission interposed between said engine and at least one wheel of the vehicle and being shiftable into a plurality of gears in dependency upon the operating conditions of the vehicle, said conditions including:

a traction condition involving propulsion of the vehicle by at least one of said engine and said machine, a coasting condition involving a deceleration of the vehicle which entails a conversion of kinetic energy developing as a result of deceleration of the vehicle into at least one of electrical energy and rotational energy, wherein said electrical energy is stored in at least one electrical storage facility and said rotational energy is stored in at least one rotatory mass, a cold starting condition involving a starting of cold engine by said machine, a warm starting condition, wherein the engine, while still hot due to a previous operation, is restarted by one of said machine and said rotatory mass, which for said restarting is rotationally coupled to the crankshaft, in order to use said stored rotational energy for the restarting and means for selectively connecting said electrical machine (a) with a rotary input shaft of said transmission and (b) with the at least one wheel by way of an output shaft of said transmission, wherein said electrical machine is connectable, in accordance with a characteristic curve denoting the RPM-dependent efficiency and having a maximum, with that one of said input and output shafts the RPM of which is nearer to the RPM denoted by said maximum of said curve.

16. The power train of claim 15, wherein said transmission is an automated transmission having a rotary input shaft and a rotary output shaft connected with the at least one wheel, and further comprising a starter clutch engageable to connect a rotary output element of said engine with said input shaft, a second clutch engageable to connect said output element and said electrical machine with said output shaft, and an engageable-disengageable third clutch interposed between said electrical machine and said output shaft, said electrical machine being connected with said output shaft in response to engagement of said third clutch and simultaneous disengagement of said second clutch and said electrical machine being connected with said input shaft in response to disengagement of said third clutch and simultaneous engagement of said starter clutch and said second clutch.

17. The power train of claim 16, wherein said electrical machine is arranged to synchronize the RPM of said input shaft with the RPM of said output shaft in response to shifting of said transmission into at least one of said gears.

18. A power train for moving a vehicle during different stages of operation, comprising:

at least one internal combustion engine with a crankshaft;

at least one electrical machine connectable with said engine and arranged to function as a motor and as a generator; and at least one countershaft transmission interposed between said engine and at least one wheel of the vehicle and being shiftable into a plurality of gears in dependency upon the operating conditions of the vehicle, said conditions including:

a traction condition involving propulsion of the vehicle by at least one of said engine and said machine, a coasting condition involving a deceleration of the vehicle which entails a conversion of kinetic energy developing as a result of deceleration of the vehicle into at least one of electrical energy and rotational energy, wherein said electrical energy is stored in at least one electrical storage facility and said rotational energy is stored in at least one rotatory mass, a cold starting condition involving a starting of cold engine by said machine, a warm starting condition, wherein the engine, while still hot due to a previous operation, is restarted by one of said machine and said rotatory mass, which for said restarting is rotationally coupled to the crankshaft, in order to use said stored rotational energy for the restarting; and means for coupling said electrical machine with said engine, said gears of said transmission including a gear in which a rotary output element of said engine is rotated by said electrical machine at a low speed while the vehicle is coasting.

19. The power train of claim 18, wherein said low speed is below about 1500 RPM.

20. The power train of claim 18, wherein said low speed is below about 1000 RPM.

21. A power train for moving a vehicle during different stages of operation, comprising:

at least one internal combustion engine with a crankshaft;

at least one electrical machine connectable with said engine and arranged to function as a motor and as a generator; and at least one countershaft transmission interposed between said engine and at least one wheel of the vehicle and being shiftable into a plurality of gears in dependency upon the operating conditions of the vehicle, said conditions including:

a traction condition involving propulsion of the vehicle by at least one of said engine and said machine, a coasting condition involving a deceleration of the vehicle which entails a conversion of kinetic energy developing as a result of deceleration of the vehicle into at least one of electrical energy and rotational energy, wherein said electrical energy is stored in at least one electrical storage facility and said rotational energy is stored in at least one rotatory mass, a cold starting condition involving a starting of cold engine by said machine, a warm starting condition, wherein the engine, while still hot due to a previous operation, is restarted by one of said machine and said rotatory mass, which for said restarting is rotationally coupled to the crankshaft, in order to use said stored rotational energy for the restarting, and means for lowering the compression ratio of said engine during starting thereof.

22. A power train for moving a vehicle during different stages of operation, comprising:

at least one internal combustion engine with a crankshaft;

at least one electrical machine connectable with said engine and arranged to function as a motor and as a generator; and at least one countershaft transmission interposed between said engine and at least one wheel of the vehicle and being shiftable into a plurality of gears in dependency upon the operating conditions of the vehicle, said conditions including:

a traction condition involving propulsion of the vehicle by at least one of said engine and said machine, a coasting condition involving a deceleration of the vehicle which entails a conversion of kinetic energy developing as a result of deceleration of the vehicle into at least one of electrical energy and rotational energy, wherein said electrical energy is stored in at least one electrical storage facility and said rotational energy is stored in at least one rotatory mass, a cold starting condition involving a starting of cold engine by said machine, and a warm starting condition, wherein the engine, while still hot due to a previous operation, is restarted by one of said machine and said rotatory mass, which for said restarting is rotationally coupled to the crankshaft, in order to use said stored rotational energy for the restarting, wherein said electrical machine is arranged to generate heat and is adjacent a starter clutch which generates heat in response to slip, the heat which is being generated by said electrical machine, while the output of said machine at least approximates a maximum value, being dissipated into the surrounding atmosphere and said machine as well as said clutch being operated in dependency upon the extent of heat dissipation.

23. The power train of claim 22, further comprising means for effecting an alternative regulation of at least one of said machine and said clutch as a function of combined heat output thereof.

* * * * *